US012281779B2

(12) United States Patent
Wu et al.

(10) Patent No.: US 12,281,779 B2
(45) Date of Patent: Apr. 22, 2025

(54) LED DECORATIVE LAMP AND PRODUCTION PROCESS THEREOF

(71) Applicants: Qingbiao Wu, Fujian (CN); Linlin Wu, Fujian (CN)

(72) Inventors: Qingbiao Wu, Fujian (CN); Linlin Wu, Fujian (CN)

( * ) Notice: Subject to any disclaimer, the term of this patent is extended or adjusted under 35 U.S.C. 154(b) by 73 days.

(21) Appl. No.: 18/241,910

(22) Filed: Sep. 4, 2023

(65) Prior Publication Data

US 2025/0035288 A1 Jan. 30, 2025

(30) Foreign Application Priority Data

Jul. 25, 2023 (CN) ......................... 202321965021.8

(51) Int. Cl.

*F21V 19/00* (2006.01)
*F21S 4/10* (2016.01)
*F21V 1/00* (2006.01)
*F21Y 115/10* (2016.01)

(52) U.S. Cl.

CPC ............ *F21V 19/0025* (2013.01); *F21S 4/10* (2016.01); *F21V 1/00* (2013.01); *F21Y 2115/10* (2016.08)

(58) Field of Classification Search

CPC .......... F21V 19/0025; F21V 1/00; F21S 4/10; F21Y 2115/10
USPC ........................................ 439/699.2; 362/396
See application file for complete search history.

(56) References Cited

U.S. PATENT DOCUMENTS

| | | | | |
|---|---|---|---|---|
| 10,393,351 | B2 * | 8/2019 | Chen | F21V 17/101 |
| 2008/0089078 | A1 * | 4/2008 | Wu | H01R 33/09 362/382 |
| 2009/0080195 | A1 * | 3/2009 | Huang | F21V 31/005 362/267 |
| 2012/0033439 | A1 * | 2/2012 | Liu | F21V 3/02 362/457 |
| 2017/0254523 | A1 * | 9/2017 | Tsai | F21V 19/005 |

* cited by examiner

*Primary Examiner* — Omar Rojas Cadima

(57) ABSTRACT

An LED decorative lamp, having a lampholder body, a blocking member, an LED, and leads; the lampholder body is provided with a channel longitudinally penetrating both ends at a first opening and a second opening of the lampholder body; the LED, the leads, and the blocking member are arranged in the channel; the LED extends out of the second opening, the blocking member has a blocking end and a separation end, the blocking end is arranged in the channel and is in interference fit with the first opening, and the separation end is arranged in the channel and extends towards the second opening so as to be positioned between the two poles of the LED. A production process of the LED decorative lamp is provided.

18 Claims, 20 Drawing Sheets

LED DECORATIVE LAMP AND PRODUCTION PROCESS THEREOF

BACKGROUND OF THE INVENTION

The present utility model relates to the technical field of decorative illumination, and in particular to an LED decorative lamp and a production process thereof.

With the development of economy and society and the improvement of LED technology, LEDs have been more and more widely used in daily life of people, and LED lighting devices are being increasingly used in various outdoor scenarios, such as outdoor landscape lighting, illumination lighting, and large building lighting.

The Chinese utility model patent CN2831526Y discloses a modular decorative lamp, which includes a lampshade, an LED, and a lampholder, wherein the lampholder includes an inner housing and an outer housing, two longitudinal through holes are arranged in the inner housing, an upper and a lower surfaces of the inner housing are each provided with openings corresponding to the longitudinal through holes; pins and leads of the LED pass through the openings and are in mutual contact in the two longitudinal through holes to achieve electric connection. Although the prior art described above features very convenient installation, processing, disassembly, and maintenance, it has a poor waterproof effect and cannot solve the problem that when being installed outdoors, it will be damaged once rainwater enters.

In view of this, the inventors have made an in-depth exploration of the problems described above, thereby resulting in the present utility model.

BRIEF SUMMARY OF THE INVENTION

It is an object of the present utility model to provide an LED decorative lamp which is simple in structure, low in costs, and achieves good waterproof effect.

To attain the above object, the present utility adopts the following technical solutions:

An LED decorative lamp, comprising a lampholder and light source parts arranged in the lampholder; the light source parts comprises an LED and leads; the LED is welded to the leads, and the lampholder comprises a lampholder body and a blocking member configured to prevent a short circuit caused by two poles of the LED coming into contact with each other; the lampholder body and the blocking member are both made of an insulating material; the lampholder body is provided with a channel that penetrates through the lampholder body longitudinally at a first opening and a second opening of the lampholder body; the blocking member as well as the LED and the leads electrically connected are arranged in the channel; the LED partially extends out of the second opening; the blocking member comprises a blocking end and a separation end connected with each other; the blocking end is arranged in the channel and is in interference fit with the first opening to seal the first opening; the separation end is arranged in the channel and extends towards the second opening so as to be positioned between the two poles of the LED.

Preferably, the channel is filled with an insulating glue.

Preferably, two first grooves are symmetrically arranged at two side walls of the blocking end respectively; two second grooves are arranged in an inner wall of the lampholder body at positions corresponding to the first grooves, edges of each of the first grooves and corresponding edges of a corresponding second groove are mutually engaged to form an accommodating space to accommodate a corresponding lead.

Preferably, a limiting platform is provided on the lampholder body at an inner side of the second opening, and the LED is provided with a first flange.

Preferably, the first flange is arranged in the channel and abuts against the limiting platform, and a part of the LED extends out of the second opening.

Preferably, further comprising a lampshade; the lampshade comprises a shade body and an installation part integrally connected with the shade body; an inner cavity is provided in the lampshade, and the inner cavity extends from the installation part to the shade body; the LED is disposed in the inner cavity; and the first flange is in interference fit with an inner wall of the installation part;

- alternatively, further comprising a lampshade; the lampshade comprises a shade body and an installation part integrally connected with the shade body; an inner cavity is provided in the lampshade, and the inner cavity extends from the installation part to the shade body; the LED is disposed in the inner cavity; an outer diameter of the first flange is greater than an inner diameter of the installation part; when the LED is disposed in the inner cavity, the first flange abuts against an end surface of the installation part.

Preferably, the installation part is provided with a second flange; an outer diameter of the second flange is greater than an outer diameter of the installation part; the second flange is arranged in the channel, and the second flange abuts against the limiting platform; the shade body is arranged outside the second opening.

Preferably, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; an outer wall of the lampholder body corresponding to the first opening is provided with a third flange, an inner diameter of the installation part is smaller than an outer diameter of the third flange, the lampholder body is arranged in the inner cavity, and the third flange abuts against an end surface of the installation part;

- alternatively, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; an outer wall of the lampholder body corresponding to the first opening is provided with a third flange; the third flange is in interference fit with an inner wall of the installation part.

Preferably, the lampholder body comprises a first lampholder body and a second lampholder body removably connected with each other by buckling; the channel is provided longitudinally through the first lampholder body and the second lampholder body; one end of the first lampholder body distal from the second lampholder body is provided with said first opening; one end of the second lampholder body distal from the first lampholder body is provided with said second opening.

The present utility model also provides a manufacturing method for LED decorative lamp, and the method is simpler, lower in costs, and achieves good waterproof effect.

To attain the above object, the present utility adopts the following technical solutions:

A manufacturing method for the LED decorative lamp described above, comprising the following steps:

S1, forming the lampholder body and the blocking member with an insulating material by injection molding;

S2, installing the LED and the leads in the channel, pressing the LED and the leads in the channel until the LED partially extends out of the second opening;

S3, filling the channel after step S2 with a predetermined amount of insulating glue;

S4, inserting the blocking member into the channel filled with the insulating glue, and pressing the blocking member so that the separation end of the blocking member is arranged in the channel and extends towards the second opening so as to be positioned between the two poles of the LED, and the blocking end of the blocking member is arranged in the channel and seals the first opening;

S5, visually inspecting a surface of the lampholder after step S4 to determine whether the surface is clean, detecting from an appearance of a final product obtained where the insulating glue is cured to check whether there is any glue leakage, and then performing a lighting test with a test probe using an AC120V 60 HZ power supply.

Preferably, step S2 is formed by the following steps:

S21, welding the two poles of the LED to the leads respectively;

S22, installing the LED welded with the leads in the channel along the direction from the first opening to the second opening, pressing the LED welded with the leads in the channel until the LED partially extends out of the second opening.

Preferably, the lampholder body comprises a first lampholder body and a second lampholder body removably connected with each other by buckling; the channel is provided longitudinally through the first lampholder body and the second lampholder body; one end of the first lampholder body distal from the second lampholder body is provided with said first opening; one end of the second lampholder body distal from the first lampholder body is provided with said second opening.

Preferably, step S2 is formed by the following steps:

S21, passing the leads through the channel of the lampholder body in the first lampholder body along a direction from the first opening to the second opening, wherein part of the leads extend out of the first lampholder body;

S22, electrically connecting the leads extended out of the first lampholder body in step S21 with the two poles of the LED by welding;

S23, installing the LED welded with the leads in step S22 in the second lampholder body, pressing the LED welded with the leads into the second opening so that part of the LED extends out of the second opening;

S24, pressing the second lampholder body against the first lampholder body, and connecting the first lampholder body and the second lampholder body by buckling.

Preferably, further comprising a lampshade; the lampshade comprises a shade body and an installation part integrally connected with the shade body; an inner cavity configured to accommodate the LED is provided in the lampshade, and the inner cavity extends from the installation part to the shade body.

Preferably, step S2 is formed by the following steps:

S21, forming a lampshade using an insulating material by injection molding, wherein a shade body, an installation part, and an inner cavity are simultaneously formed while forming the lampshade, and a second flange is formed on the installation part;

S22, passing the leads through the channel of the lampholder in the first lampholder body along a direction from the first opening to the second opening, wherein part of the leads extends out of the first lampholder body;

S23, electrically connecting the leads extended out of the first lampholder body in step S22 with the two poles of the LED by welding;

S24, installing the LED welded with the leads in step S23 into the inner cavity, pressing the LED welded with the leads in the inner cavity;

S25, installing the lampshade installed with the LED and the leads in the second lampholder body, pressing the lampshade into the second opening;

S26, pressing the second lampholder body against the first lampholder body, and connecting the first lampholder body and the second lampholder body by buckling.

Preferably, step S2 is formed by the following steps:

S21, forming a lampshade using an insulating material by injection molding, wherein a shade body, an installation part, and an inner cavity are simultaneously formed while forming the lampshade, and a second flange is formed on the installation part;

S22, passing the leads through the channel of the lampholder body in the first lampholder body along a direction from the first opening to the second opening, wherein part of the leads extend out of the first lampholder body;

S23, electrically connecting the leads extended out of the first lampholder body in step S22 with the two poles of the LED by welding;

S24, installing the installation part of the lampshade into the second lampholder body along a direction from the second opening to the first opening, pressing the installation part into the second opening;

S25, placing the LED and the leads, which are welded to each other, into the second lampholder body, and further pressing the LED and the leads into the inner cavity;

S26, pressing the second lampholder body against the first lampholder body, and connecting the first lampholder body and the second lampholder body by buckling.

Preferably, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; inserting the final product already subject to the lighting test in step S5 into the inner cavity; connecting the cover cap and the installation part by buckling.

By using the above technical solutions, the present utility model achieves the following beneficial effects: During installation, the LED and the leads are installed in the channel, and then the separation end of the blocking member is installed between the leads and the two poles of the LED to avoid a short circuit; the blocking end of the blocking member is installed in the channel and is in interference fit with the first opening, so that good sealing effect is formed between the blocking end and the lampholder body, so that the light source parts arranged in the lampholder body have a good waterproof effect, and the waterproof performance of the LED decorative lamp is effectively improved; the channel is filled with the insulating glue so that the waterproof performance of the LED decorative lamp is further improved. The present utility model has a simpler production process, very convenient installation and processing, and a lower cost.

Figure 1:
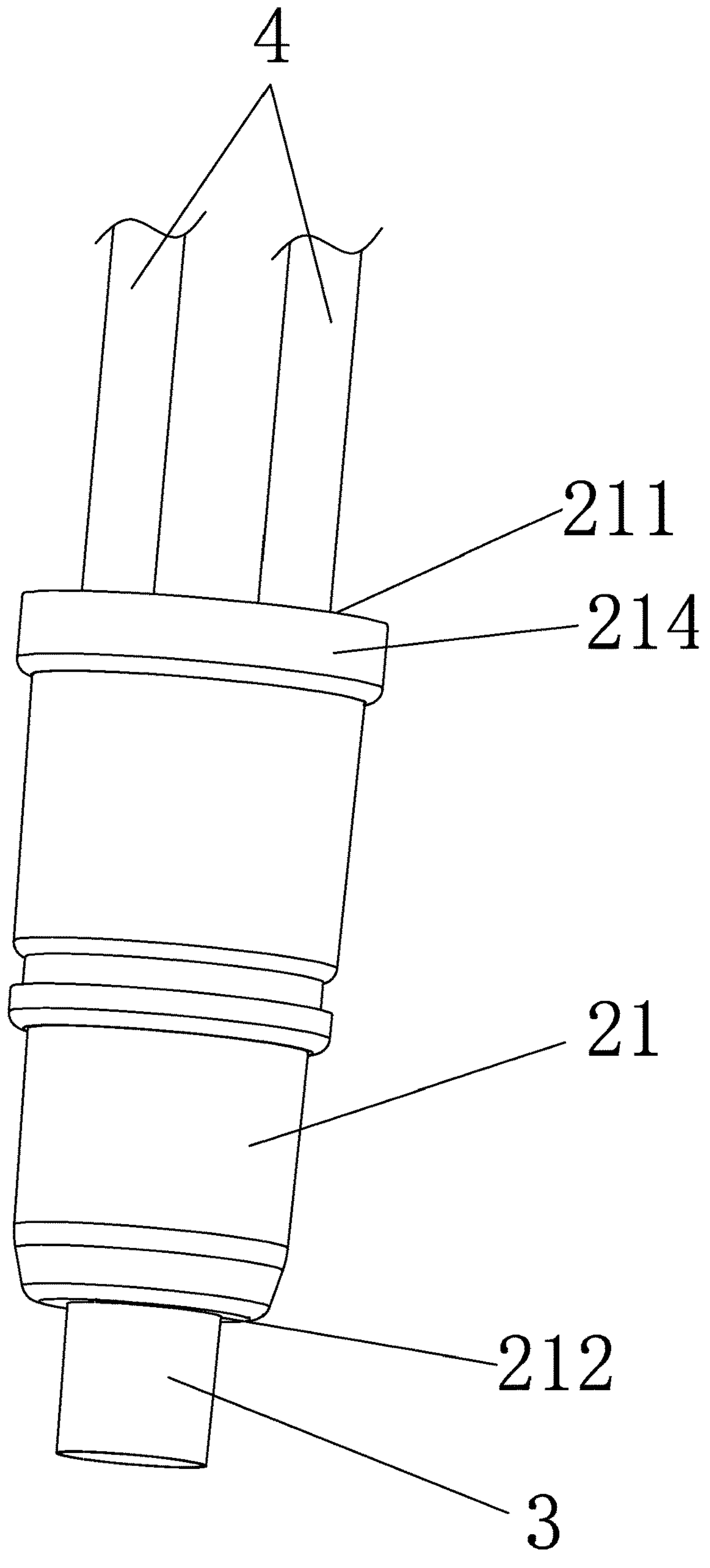
FIG. 1 is a schematic structural view of Embodiment I according to the present utility model.

In the figures, reference numerals include: A lampshade 1, a shade body 11, an installation part 12, a second flange 121, an inner cavity 13, a lampholder 2, a lampholder body 21, a first opening 211, a second opening 212, a limiting platform 213, a third flange 214, a first lampholder body 215, a second lampholder body 216, an blocking member 22, a blocking end 221, an separation end 222, a first groove 223, a second groove 224, a channel 23, an LED 3, a first flange 31, a lead 4, and a cover cap 5; recess 51.

DETAILED DESCRIPTION OF THE INVENTION

The technical solution of the present utility model will be clearly and comprehensively described below with reference to the drawings in the embodiments of the present utility model, wherein the described embodiments are obviously some, but not all, of the embodiments of the present utility model. On the basis of the embodiments of the present utility model, all other embodiments obtained by those of ordinary skills in the art without inventive efforts shall fall within the protection scope of the present utility model.

Embodiment I

A first structure according to embodiment I is shown in FIGS. 1-4.

Figure 2:
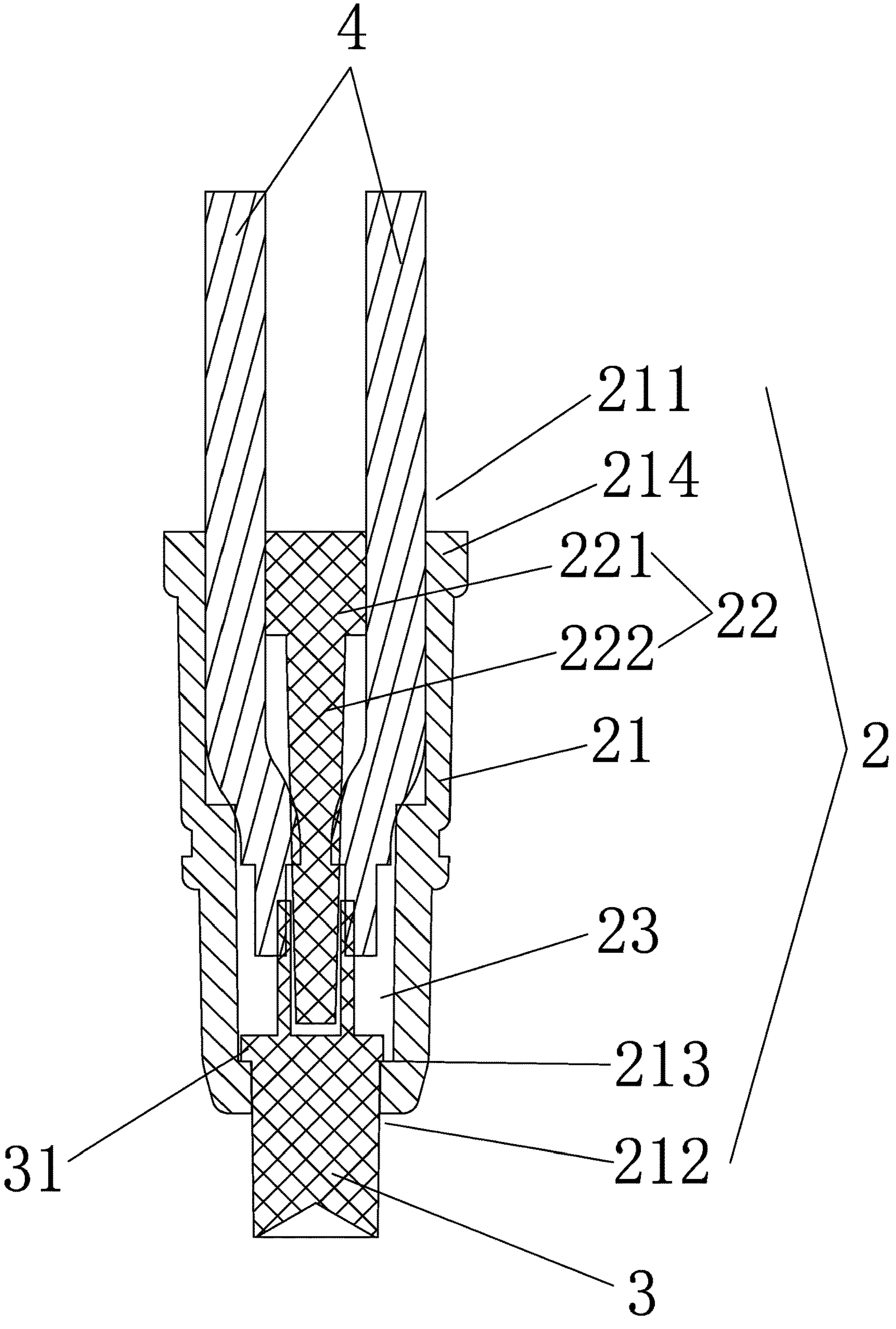
FIG. 2 is a cross-sectional view of Embodiment I according to the present utility model.
Figure 3:
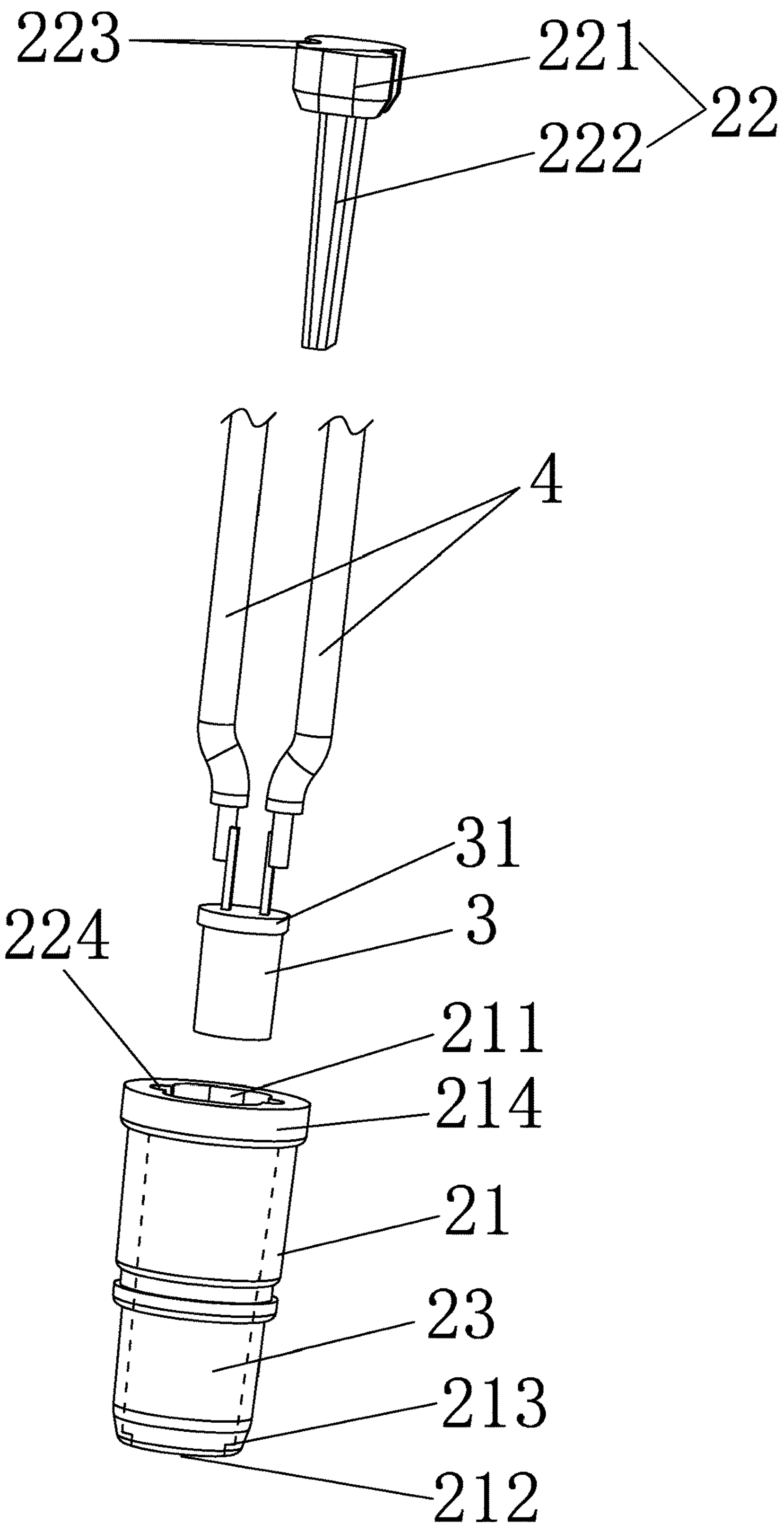
FIG. 3 is an exploded view of a first structure of Embodiment I according to the present utility model.
Figure 4:
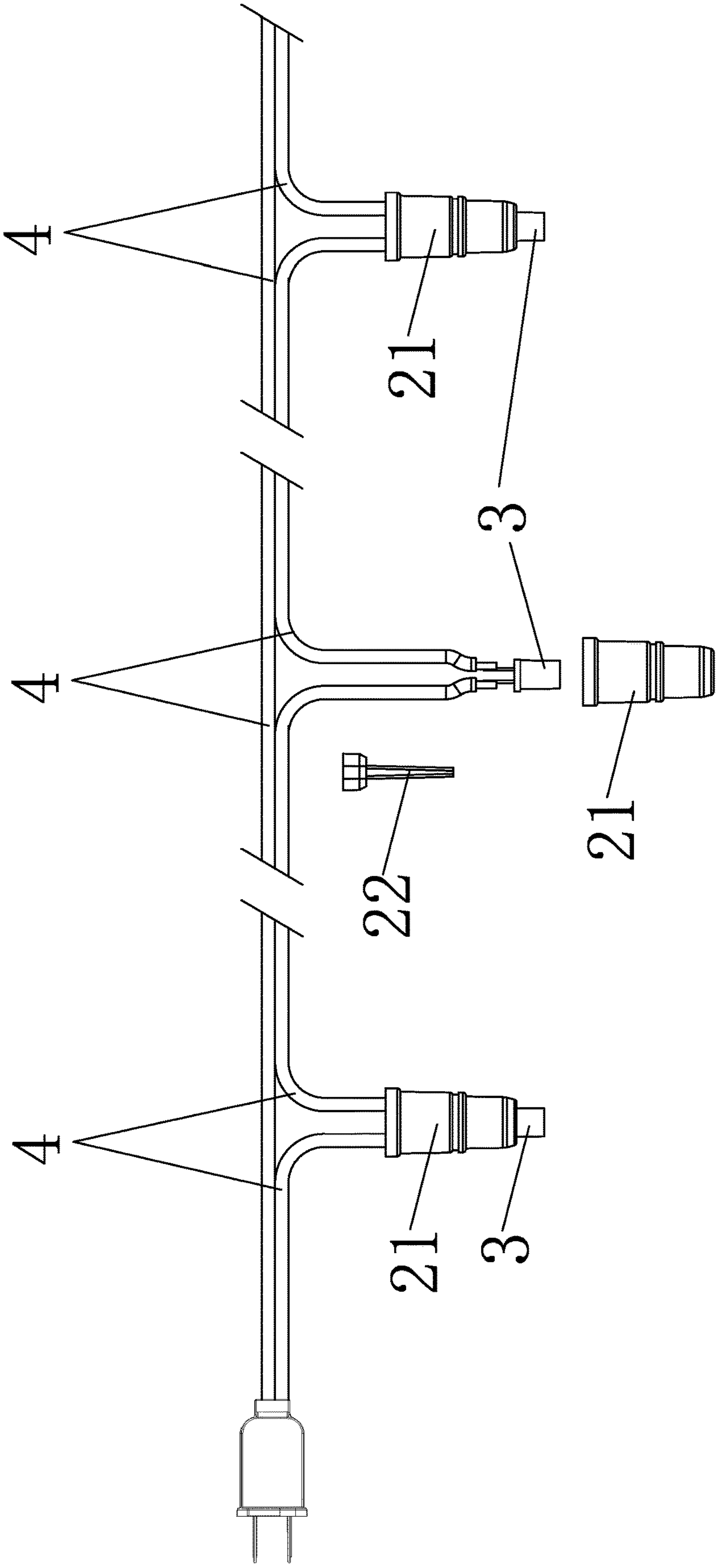
FIG. 4 is a schematic structural view of a lamp string to which Embodiment I according to the present utility model is applied.

With reference to FIGS. 1-3, an LED decorative lamp is provided, which comprises a lampholder 2 and light source parts arranged in the lampholder 2. The light source parts comprises an LED 3 and two leads 4; the LED 3 is welded to the two leads 4, and the lampholder 2 comprises a lampholder body 21 and a blocking member 22 configured to prevent a short circuit caused by two poles of the LED 3 coming into contact with each other; the lampholder body 21 and the blocking member 22 are both made of an insulating material. It should be noted that, in this embodiment, the lampholder body 21 and the blocking member 22 can each be integrally formed by injection molding, and the lampholder body 21 can be designed into any specific shape according to actual needs.

Specially with reference to FIG. 1 and FIG. 2, the lampholder body 21 is provided with a channel 23 that penetrates through the lampholder body 21 longitudinally at a first opening 211 and a second opening 212 of the lampholder body 21; the blocking member 22 as well as the LED 3 and the two leads 4 electrically connected are arranged in the channel 23; the LED 3 partially extends out of the second opening 212, and the leads 4 partially extend out of the first opening 211.

It should be noted that in this embodiment, the lampholder body 21 may be a cylinder as shown in FIGS. 1 to 6, and specifically, a diameter of the lampholder body 21 is gradually decreased along a direction from the first opening 211 to the second opening 212 (which will be described in detail below), so that the LED 3 and the leads 4, which are welded to each other, are installed in the channel 23 along the direction from the first opening 211 to the second opening 212. Of course, there are other feasible solutions in this embodiment, which will not be described in detail here.

The blocking member 22 comprises a blocking end 221 and a separation end 222 connected with each other. The separation end 222 is arranged in the channel 23 and extends towards the second opening 212 so as to be positioned between the two poles of the LED 3, and the blocking end 221 is arranged in the channel 23 and is in interference fit with the first opening 211 to seal the first opening 211. Therefore, good sealing is formed between the blocking end 221 and the lampholder body 21, so that the light source parts arranged in the lampholder body 21 have a good waterproof effect, and the general waterproof performance of the LED decorative lamp is effectively improved.

Further, the channel 23 is filled with an insulating glue (not specifically shown in the figures) so that the waterproof performance of the LED decorative lamp is further improved.

Further, two first grooves 223 are symmetrically arranged at two side walls of the blocking end 221 respectively; two second grooves 224 are arranged in an inner wall of the lampholder body 21 at positions corresponding to the first grooves 223, edges of each of the first grooves 223 and corresponding edges of each of the second grooves 224 are mutually engaged to form an accommodating space to accommodate a corresponding lead 4; accordingly, each of the two leads 4 electrically connected with a corresponding pole of the LED 3 passes through a corresponding accommodating space and is connected with an external environment. Preferably, each of the two leads 4 is tightly fitted with the corresponding accommodating space to achieve good sealing effect, so that the light source parts arranged in the lampholder body 21 are well waterproofed, and the waterproof performance of the LED decorative lamp is further improved.

Further, a limiting platform 213 is provided on the lampholder body 21 at an inner side of the second opening 212, and the LED 3 is provided with a first flange 31. The first flange 31 is arranged in the channel 23 and abuts against the limiting platform 213, and a part of the LED 3 extends out of the second opening 212, which is specifically shown in FIGS. 1 to 3.

This embodiment also relates to a production process of the LED decorative lamp described above, which can be specifically referred to in FIGS. 1 to 4, and comprises the following steps:

S1, forming the lampholder body 21 and the blocking member 22 with an insulating material by injection molding;

S2, welding the two poles of the LED 3 to the two leads 4 respectively;

S3, installing the LED 3 welded with the leads 4 in the channel 23 along a direction from the first opening 211 to the second opening 212, pressing the LED 3 welded with the leads 4 in the channel 23 until the LED 3 partially extends out of the second opening 212 and the first flange 31 arranged in the channel 23 abuts against the limiting platform 213.

S4, filling the channel 23 after step S3 with a predetermined amount of insulating glue;

S5, inserting the blocking member 22 into the channel 23 filled with the insulating glue, and pressing the blocking member 22 so that the separation end 222 of the blocking member 22 is arranged in the channel 23 and extends towards the second opening 212 so as to be positioned between the two poles of the LED 3, and the blocking end 221 of the blocking member 22 is arranged in the channel 23 and seals the first opening 211;

S6, visually inspecting a surface of the lampholder 2 after step S5 to determine whether the surface is clean, detecting from an appearance of a final product obtained where the insulating glue is cured to check whether there is any glue leakage, and then performing a lighting test with a test probe using an AC120V 60 HZ power supply.

Figure 5:
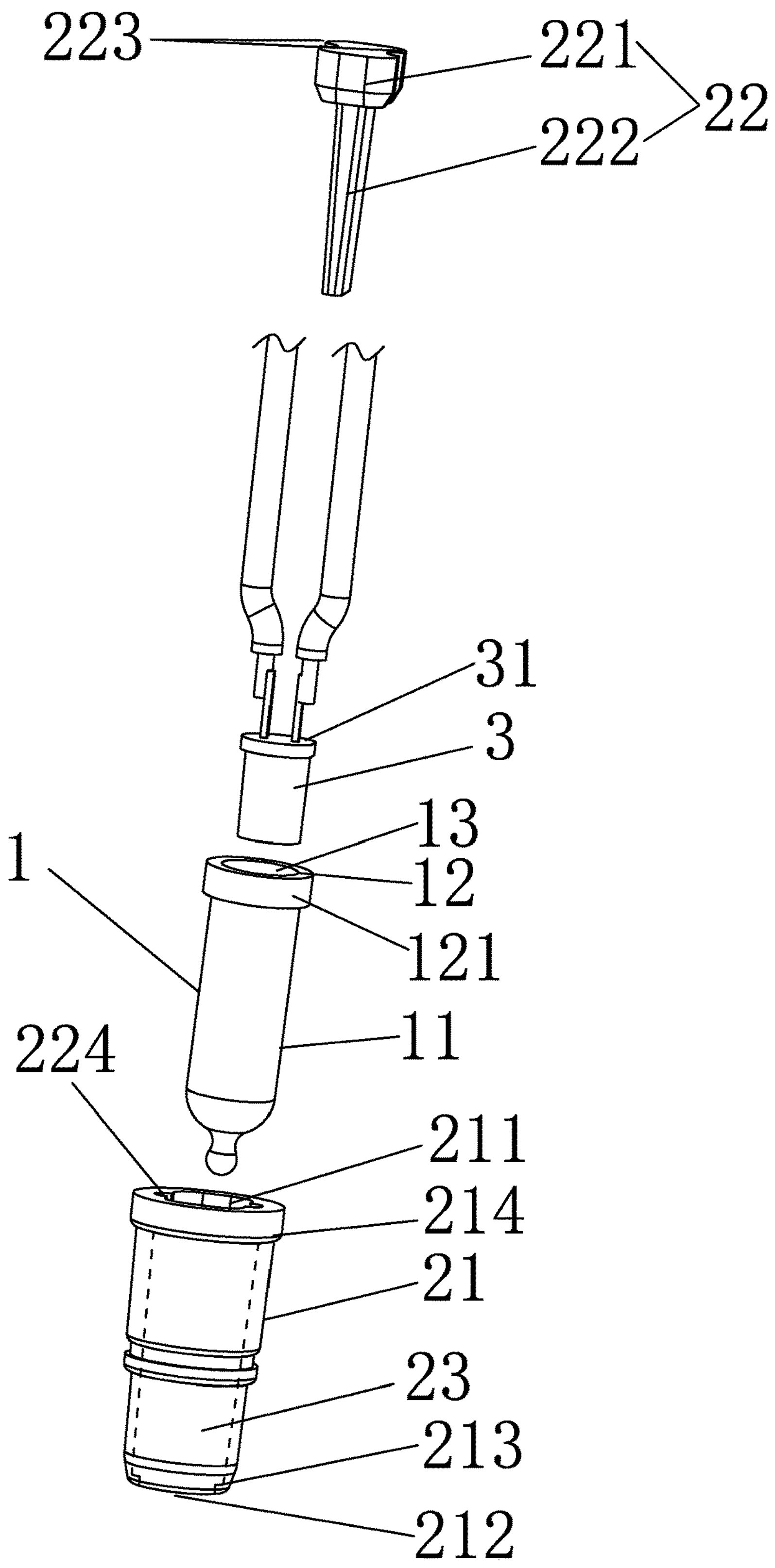
FIG. 5 is an exploded view of a second structure of Embodiment I according to the present utility model.
Figure 6:
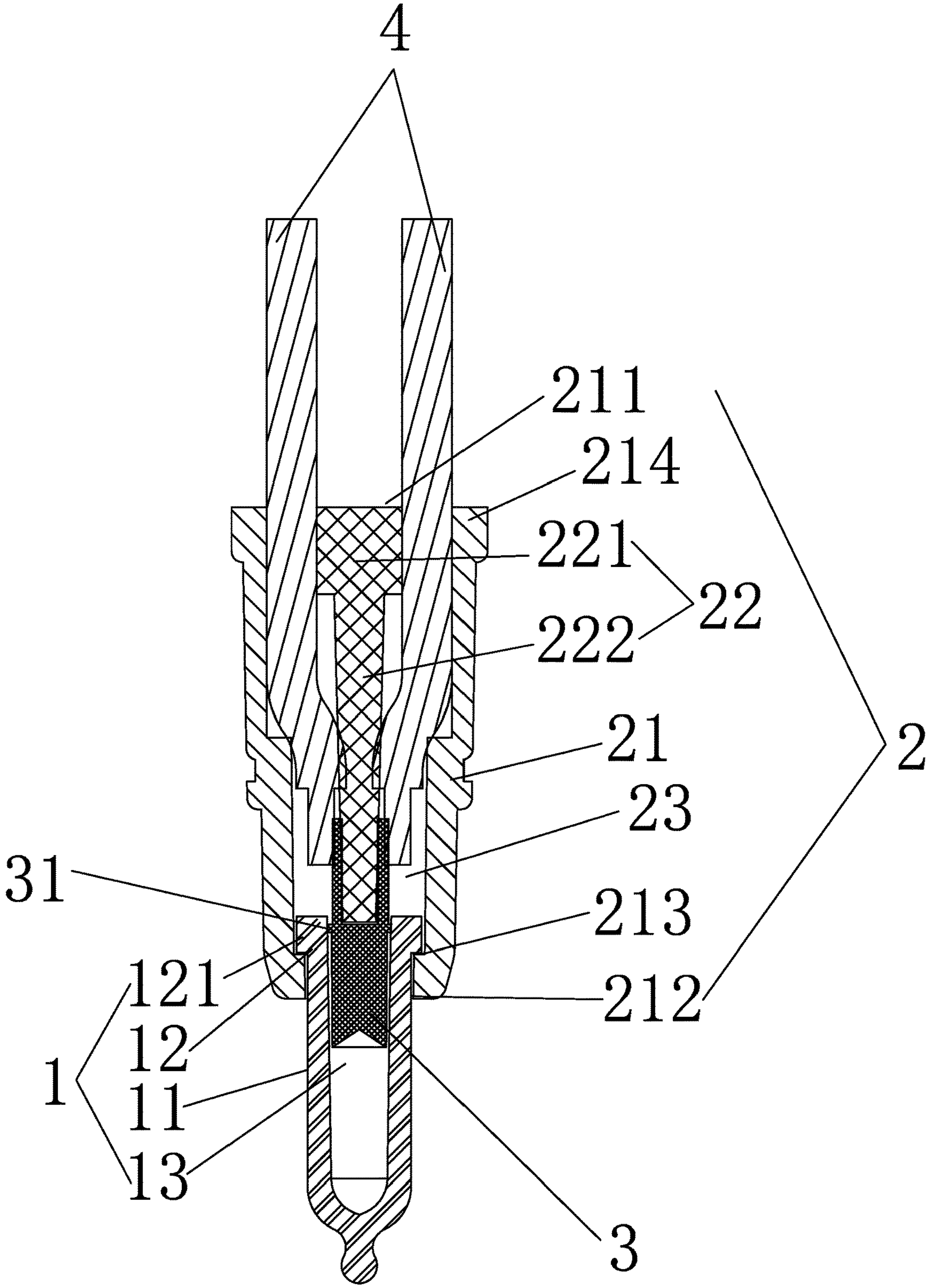
FIG. 6 is a sectional view of the second structure of Embodiment I shown in FIG. 5 assembled according to a first variation.
Figure 7:
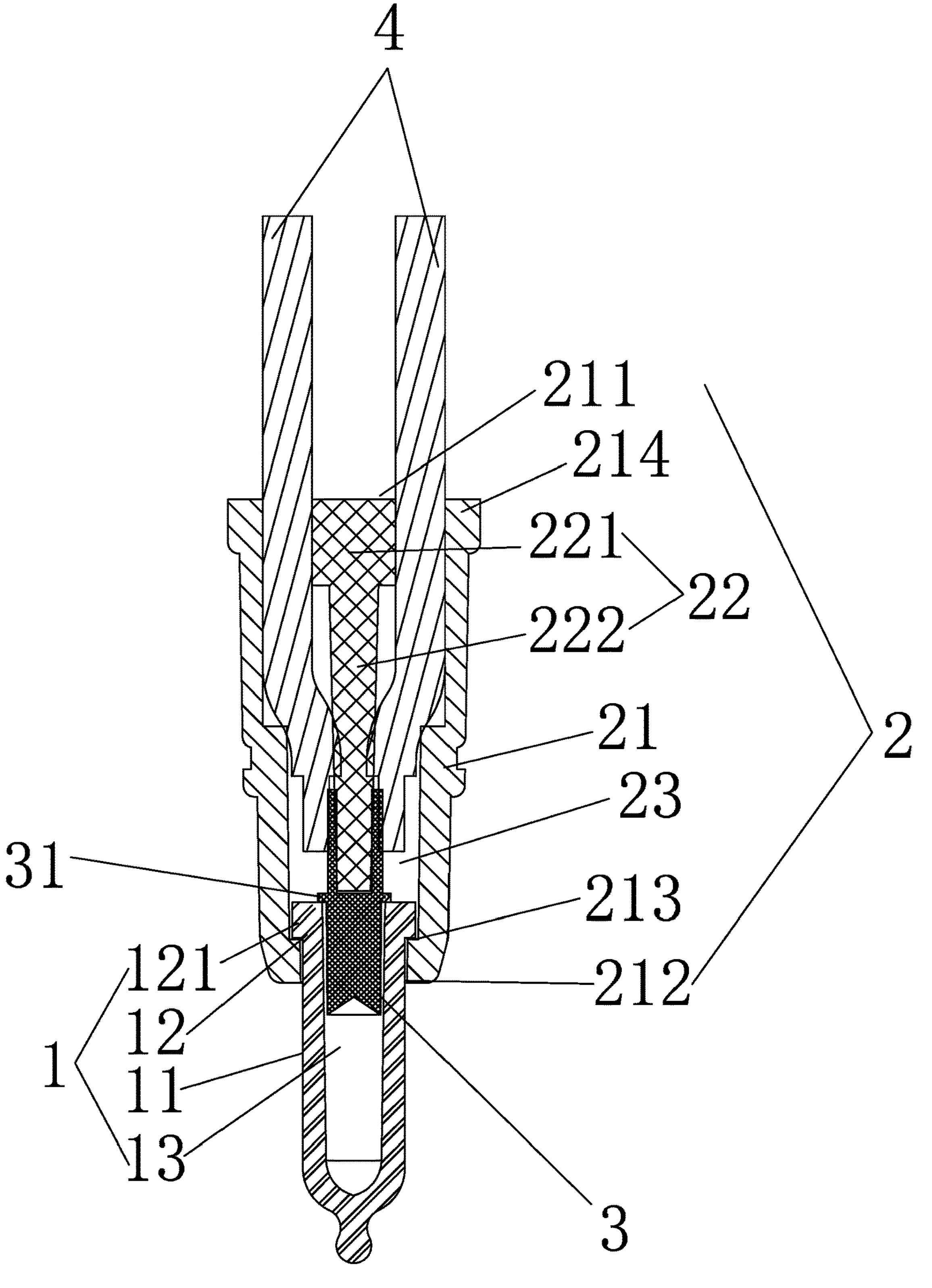
FIG. 7 is a sectional view of the second structure of Embodiment I shown in FIG. 5 assembled according to a second variation.

A second structure of the LED decorative lamp of this embodiment is further provided, which is specifically referred to in FIGS. 5-7.

On the basis of the first structure described above, this second structure further comprises a lampshade 1. The lampshade 1 comprises a shade body 11 and an installation part 12 integrally connected with the shade body 11. The installation part 12 is inserted into the lampholder body 21. A part of the lampshade 1 which extends out of the holder body 21 (i.e., the shade body 11) has an outer shape which is identical to an outer shape of a prior art lampshade of a conventional lamp, and a specific shape of the lampshade can be designed according to actual needs.

With reference to FIG. 6, an inner cavity 13 is provided in the lampshade 1, and the inner cavity 13 extends from the installation part 12 to the shade body 11; the light source parts, including the LED 3 and the leads 4, are disposed in the inner cavity 13; and the first flange 31 is in interference fit with an inner wall of the installation part 12. Of course, with reference to FIG. 7, the following structure may also be adopted in this embodiment: An inner cavity 13 is provided in the lampshade 1, and the inner cavity 13 extends from the installation part 12 to the shade body 11; the LED 3 is disposed in the inner cavity 13, an outer diameter of the first flange 31 is greater than an inner diameter of the installation part 12, the LED 3 is disposed in the inner cavity 13, and the first flange 31 abuts against an end surface of the installation part 12.

Further, the installation part 12 is provided with a second flange 121. An outer diameter of the second flange 121 is greater than an outer diameter of the installation part 12, the second flange 121 is arranged in the channel 23, and the second flange 121 abuts against the limiting platform 213. The shade body 11 is arranged outside the second opening 212.

In view of this, the production process of this structure is different from the production process of the first structure only in that:

Step S3 comprises the following steps:

S31, forming the lampshade 1 by injection molding, wherein the shade body 11, the installation part 12, and the inner cavity 13 are formed simultaneously while forming the lampshade 1, and the second flange 121 is formed on the installation part 12;

S32, installing the LED 3 welded with the leads 4 in the inner cavity 13, pressing the LED 3 into the inner cavity 13 so that the first flange 31 of the LED 3 is in interference fit with the inner wall of the installation part 12; or installing the LED 3 welded with the leads 4 in the inner cavity 13, pressing the LED 3 into the inner cavity 13 so that the first flange 31 of the LED 3 abuts against the end surface of the installation part 12;

S33, after step 32, the LED 3 and the leads 4 are already installed along a direction from the first opening 211 to the second opening 212 and pressed into predetermined positions in the channel 23; and the second flange 121 of the installation part 12 is in interference fit with the channel 23, and the shade body 11 extends out of the second opening 212;

or after step 32, the LED 3 and the leads 4 are already installed along a direction from the first opening 211 to the second opening 212 and pressed into predetermined positions in the channel 23; and the second flange 121 of the installation part 12 is disposed in the channel 23, and the second flange 121 abuts against the limiting platform 213, and the shade body 11 extends out of the second opening 212.

The rest of the process steps are the same as the process steps of the first structure, and the lampshade 1 added to this second structure can be replaced to adapt to different occasions and conditions.

Figure 8:
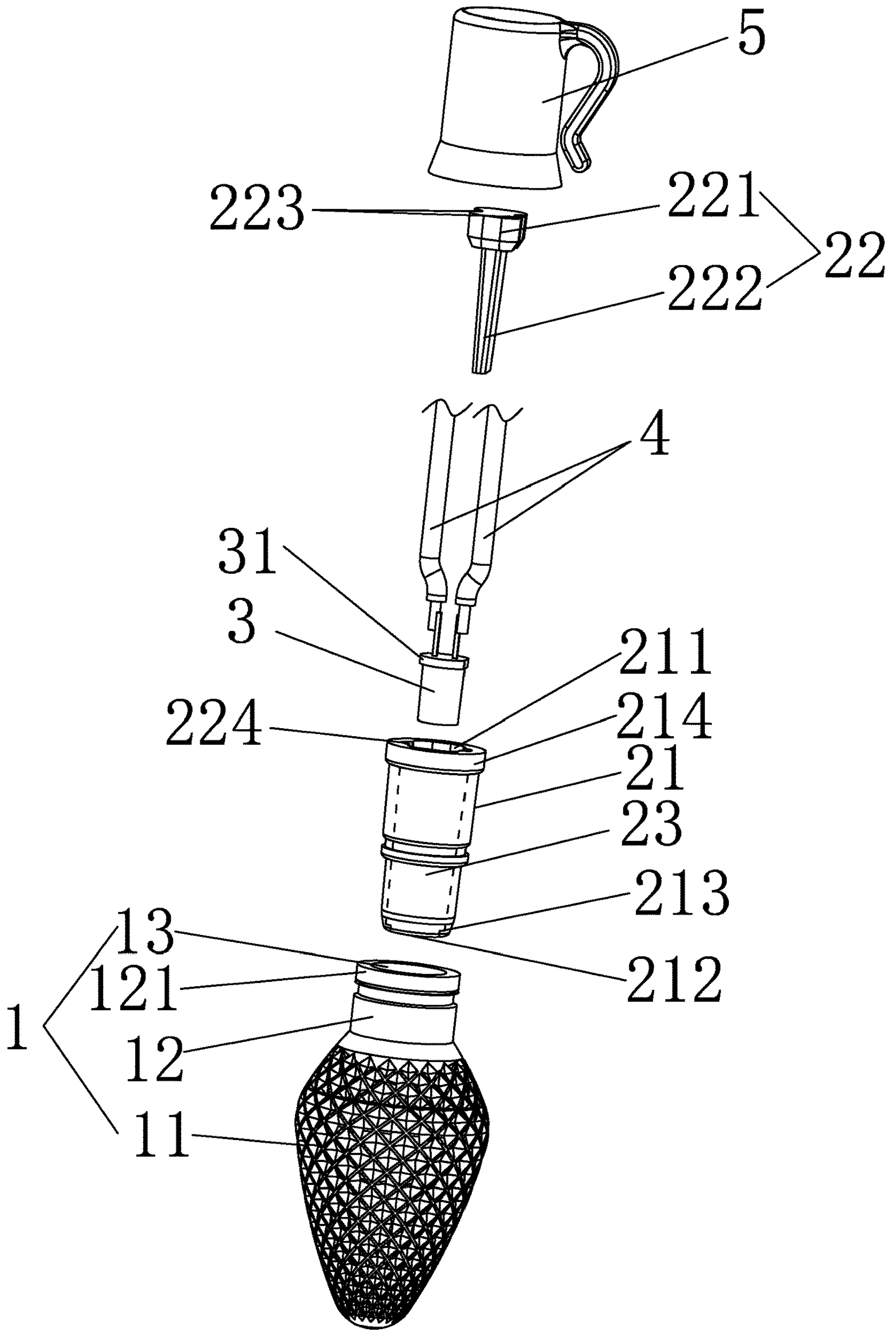
FIG. 8 is an exploded view of a third structure of Embodiment I according to the present utility model.
Figure 9:
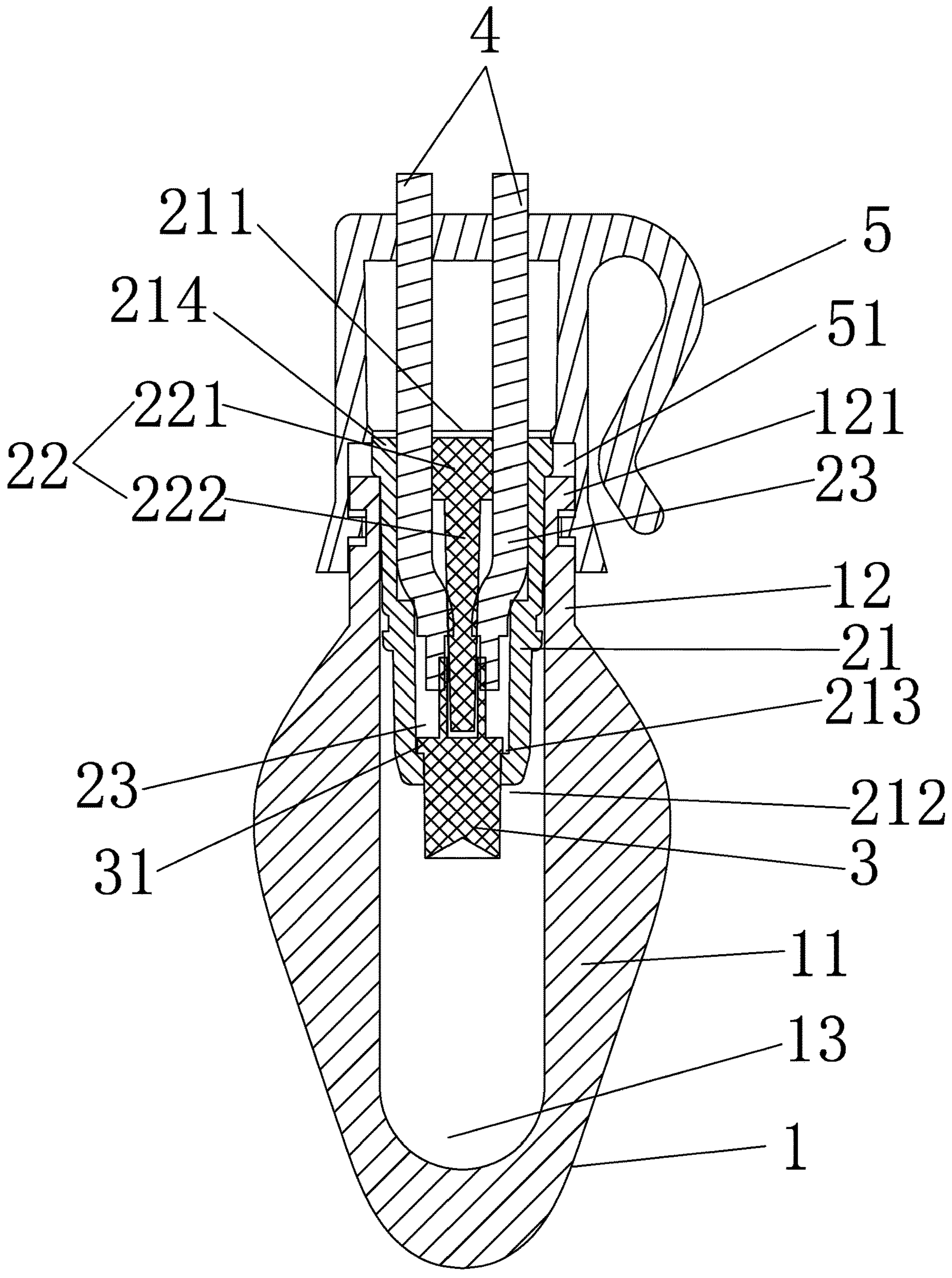
FIG. 9 is a sectional view of the third structure of Embodiment I shown in FIG. 8 assembled according to a first variation.
Figure 10:
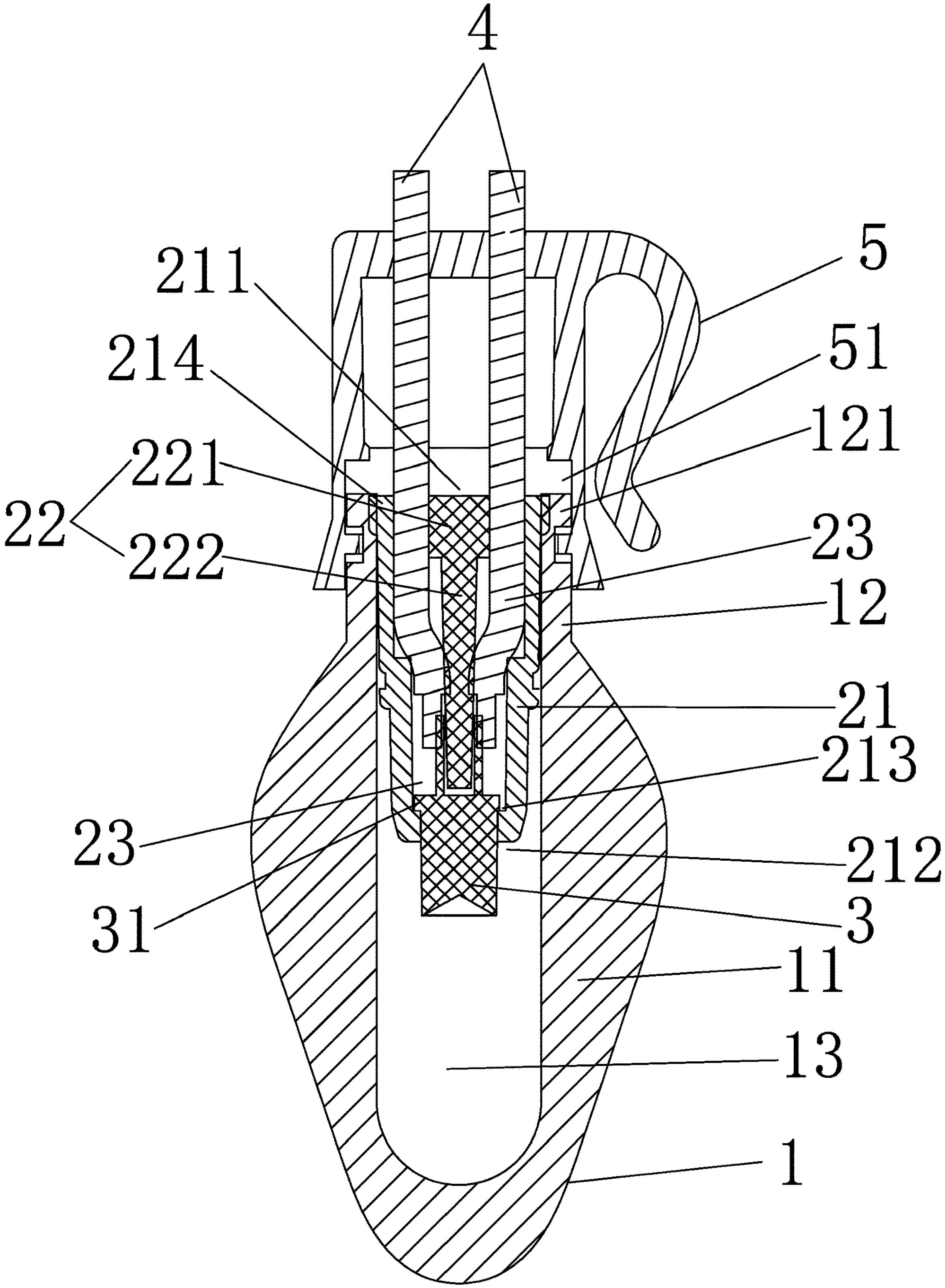
FIG. 10 is a sectional view of the third structure of Embodiment I shown in FIG. 8 assembled according to a second variation.
Figure 11:
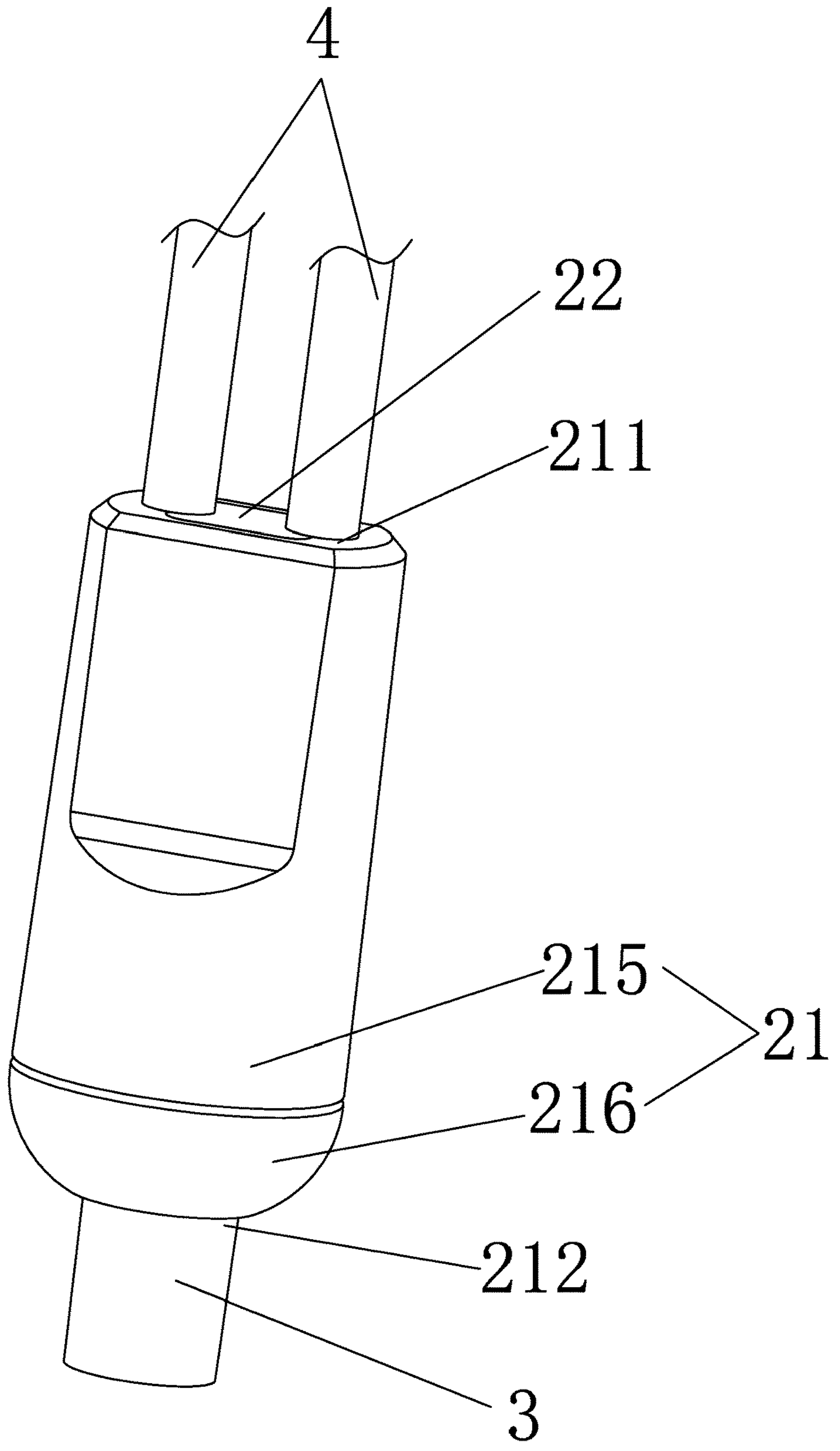
FIG. 11 is a schematic structural view of Embodiment II according to the present utility model.
Figure 12:
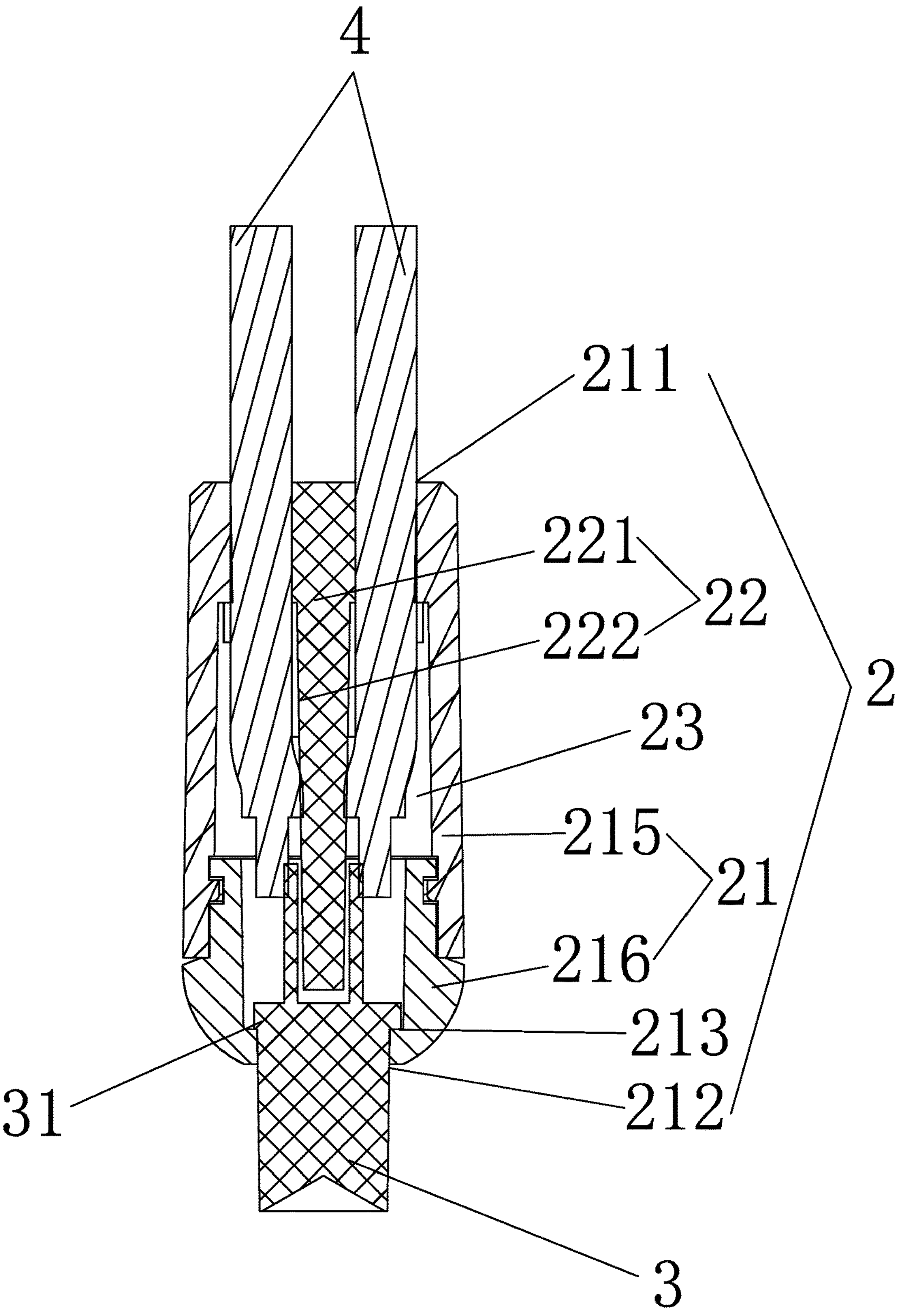
FIG. 12 is a cross-sectional view of Embodiment II according to the present utility model.
Figure 13:
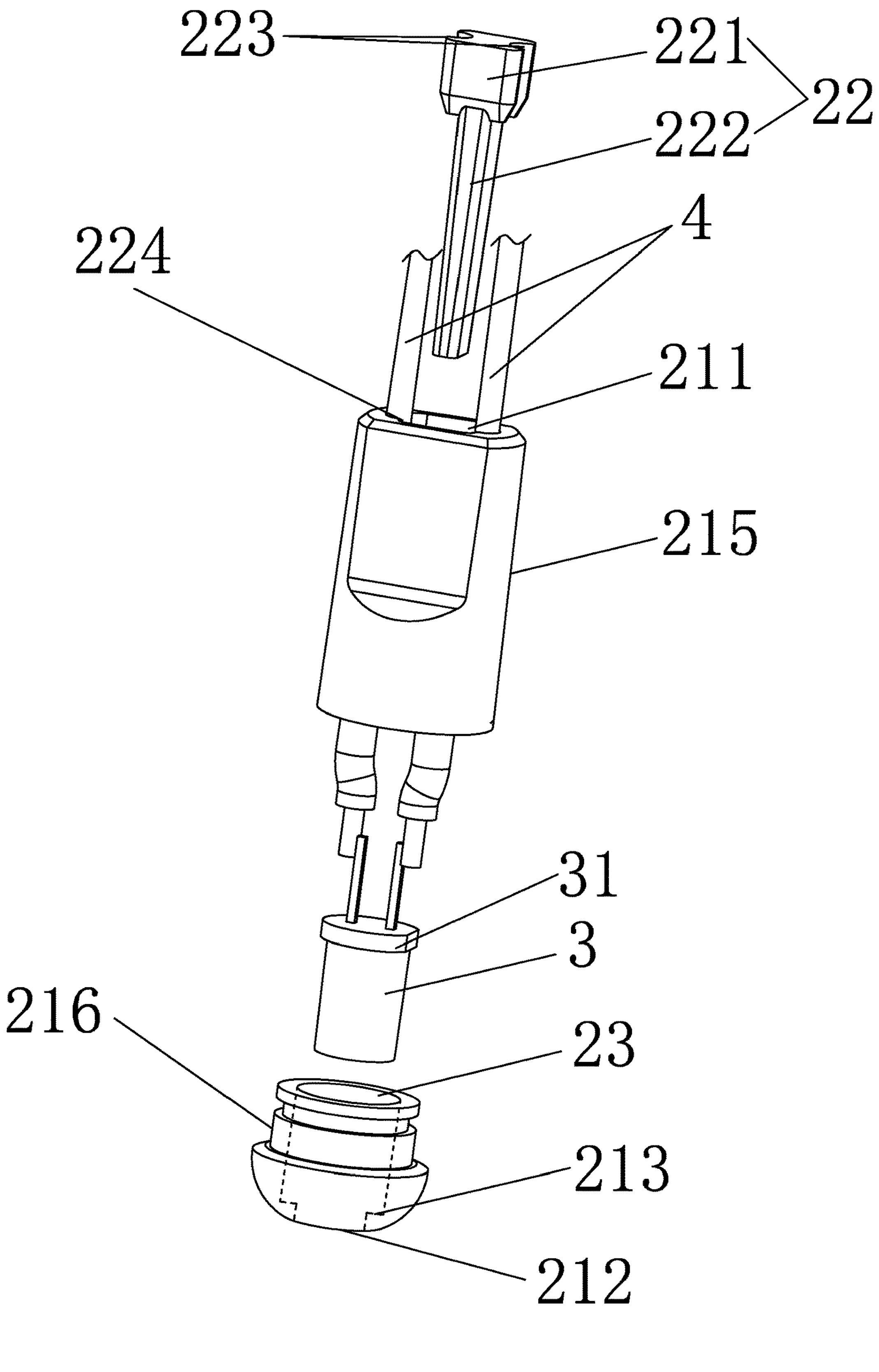
FIG. 13 is an exploded view of a first structure of Embodiment II according to the present utility model.
Figure 14:
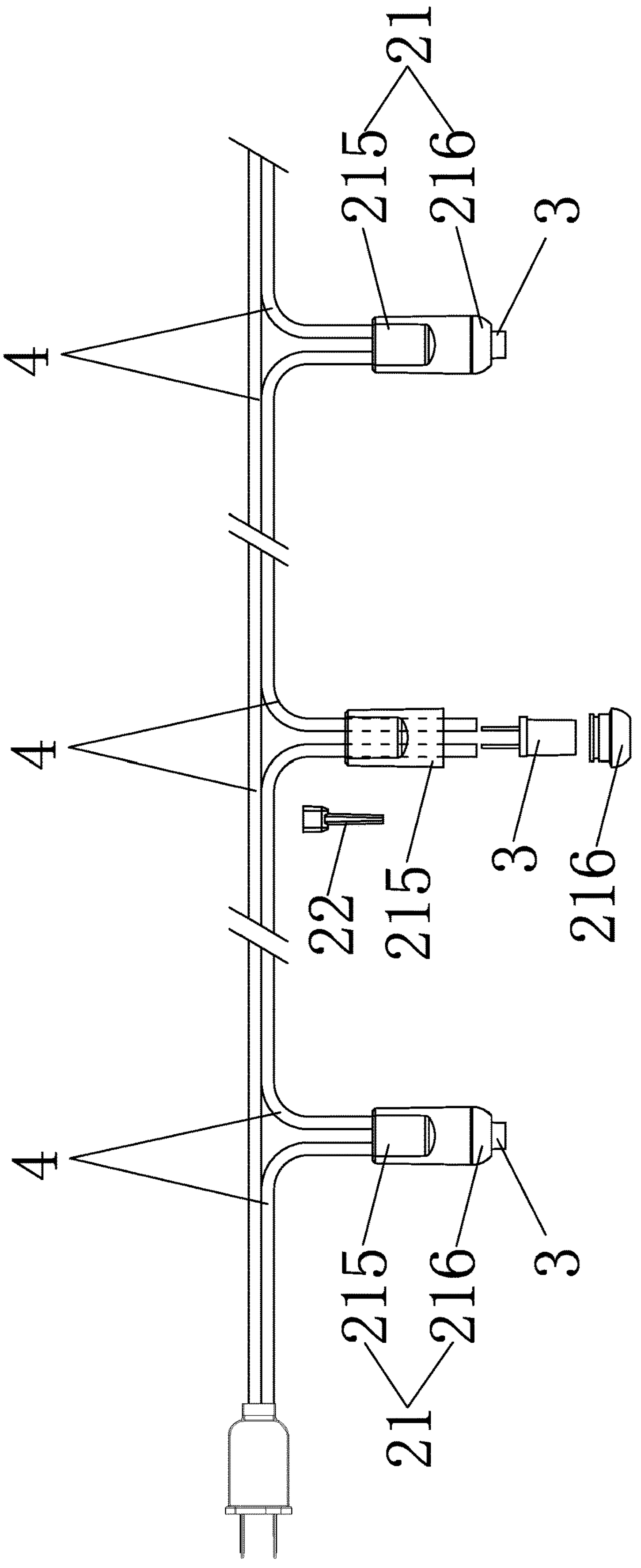
FIG. 14 is schematic structural view of a lamp string to which Embodiment II according to the present utility model is applied.

A third structure of the LED decorative lamp of this embodiment is further provided, which is specifically referred to in FIGS. 8-10.

On the basis of the first structure, this third structure further comprises a lampshade 1 and a cover cap 5 removably connected with each other. The lampshade 1 comprises a shade body 11 and an installation part 12 integrally connected with the shade body 11. The lampholder body 21 is inserted into the installation part 12.

With reference to FIG. 9, an outer wall of the lampholder body 21 corresponding to the first opening 211 is provided with a third flange 214, an inner diameter of the installation part 12 is smaller than an outer diameter of the third flange 214, the lampholder body 21 is arranged in an inner cavity 13 of the installation part 12, and the third flange 214 abuts against an end surface of the installation part 12;

or with reference to FIG. 10, the third flange 214 is in interference fit with an inner wall of the installation part 12.

An outer wall of the installation part 12 is provided with a second flange 121, an inner wall of the cover cap 5 is provided with a groove 51 corresponding to the second flange 121, and the second flange 121 is fastened to the groove to realize the connection between the lampshade 1 and the cover cap 5. Of course, the groove (not shown in the figures) may be provided at the outer wall of the installation part 12, and the flange (not shown in the figures) corresponding to the groove may be provided on the inner wall of the cover cap 5, and the flange is fastened to the groove to realize the connection between the lampshade 1 and the cover cap 5.

In view of this, the production process of this third structure is different from the production process of the first structure only in that:

The process steps of the third structure comprises the following steps after step S6:

S7: inserting the final product already subject to the lighting test in step S6 into the inner cavity 13 of the installation part 12, pressing the final product into the inner cavity 13 so that the third flange 214 of the lampholder body 21 is in interference fit with an inner wall of the inner cavity 13, and the lampholder body 21 is arranged in the inner cavity 13; or inserting the final product already subject to the lighting test in step S6 into the inner cavity 13 of the installation part 12, pressing the final product into the inner cavity 13 so that the lampholder body 21 is arranged in the inner cavity 13, and the third flange 214 of the lampholder body 21 abuts against an end surface of the installation part 12.

S8: fastening the cover cap 5 to the installation part 12.

The present utility model has a simpler production process, very convenient installation and processing, and a lower cost.

By adopting the technical solutions described above, this embodiment has the beneficial effects that: During installation, the LED 3 and the leads 4, which are electrically connected with each other, are installed in the channel 23 along a direction from the first opening 211 to the second opening 212, and then the separation end 222 of the blocking member 22 is installed between the two leads 4 and the two poles of the LED 3 to avoid a short circuit; the blocking end 221 of the blocking member 22 is installed in the channel 23 and is in interference fit with the first opening 211, so that good sealing is formed between the blocking end 221 and the lampholder body 21, so that the light source parts arranged in the lampholder body 21 have a good waterproof effect, and the waterproof performance of the LED decorative lamp is effectively improved; the channel 23 is filled with the insulating glue so that the waterproof performance of the LED decorative lamp is further improved. This embodiment has a simpler production process, very convenient installation and processing, and a lower cost.

Embodiment II

A first structure of embodiment II is shown in FIGS. 11-14.

The first structure of this embodiment is different from the first structure of Embodiment I in that:

The lampholder body 21 comprises a first lampholder body 215 and a second lampholder body 216 removably connected with each other by buckling. It should be noted that the first lampholder body 215 and the second lampholder body 216 of this embodiment may be connected in other ways, such as, but not limited to, threaded connection, as long as they can be connected with each other, and these other connection methods will not be described in detail herein.

It should be noted that, in this embodiment, the first lampholder body 215, the second lampholder body 216, and the blocking member 22 can each be integrally formed by injection molding, and a specific shape of the lampholder body 21 can be designed according to actual needs. In this embodiment, the lampholder body 21 can be a cylinder, and specifically, a diameter of the lampholder body 21 is gradually decreased along a direction from the first opening 211 to the second opening 212, so that the leads 4 of the LED decorative lamp of a decoration lamp string (as shown in FIG. 10) pass through the first lampholder body 215 along a direction from the first opening 211 to the second opening 212, wherein part of the leads 4 that have passed through the first lampholder body 215 are electrically connected with the LED 3 by welding, and then the second lampholder body 216 is moved upward towards the first lampholder body 215 so as to be connected to the first lampholder body 215 by buckling. Of course, in this embodiment, the shape of the lampholder body 21 is not limited to the shape described above, the assembly method is also not limited to the method described above, and other feasible solutions will not be described in detail here.

In view of this, the production process of the third structure of embodiment II is different from the production process of the first structure of embodiment I only in that: See FIGS. 11 to 14:

S3 comprises the following steps:

S31, passing the two leads 4 through the channel 23 of the lampholder body 21 in the first lampholder body 215 along a direction from the first opening 211 to the second opening 212, wherein part of the leads 4 extend out of the first lampholder body 215;

S32, electrically connecting the leads 4 extended out of the first lampholder body 215 in step S31 with the two poles of the LED 3 by welding;

S33, installing the LED 3 welded with the leads 4 in step S32 in the second lampholder body 216, pressing the LED 3 welded with the leads into the second opening 212 so that part of the LED 3 extends out of the second opening 212, and the first flange 31 is positioned in the channel 23 and abuts against the limiting platform 213;

S34, pressing the second lampholder body 216 against the first lampholder body 215, and connecting the first lampholder body 215 and the second lampholder body 216 by buckling.

The rest of the process steps are the same as the corresponding process steps of the first structure of Embodiment I.

A second structure of the LED decorative lamp of this embodiment is further provided, which is specifically referred to in FIGS. 15 to 18.

On the basis of the first structure of this embodiment, a lampshade 1 is added to the structure; the lampshade 1 has the same or similar structure compared with the second structure of Embodiment I, and so the lampshade 1 of this second structure of the second embodiment will not be described in detail here. It should be noted that, in this embodiment, depending on different shade bodies 11 for the lampshade 1 (as shown in FIGS. 15-18), the process steps of installing the lampshade 1 or the second lampholder body 216 will be slightly different, which will be explained in detail later. The difference between different shade bodies 11 mainly lies in a relationship between a maximum diameter of the shade body 11 and a diameter of the second opening 212.

Figure 15:
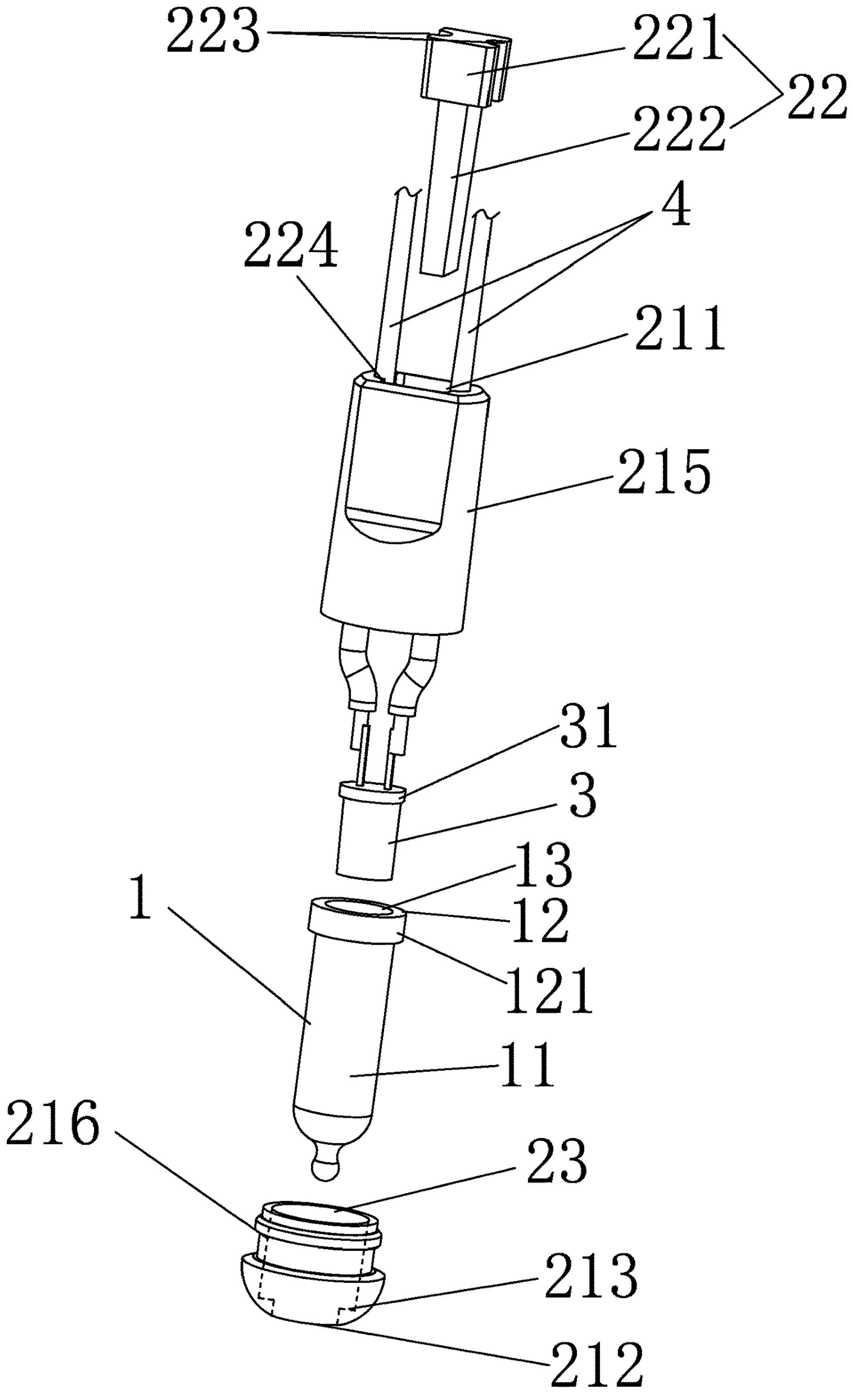
FIG. 15 is an exploded view of a second structure of Embodiment II according to the present utility model.
Figure 16:
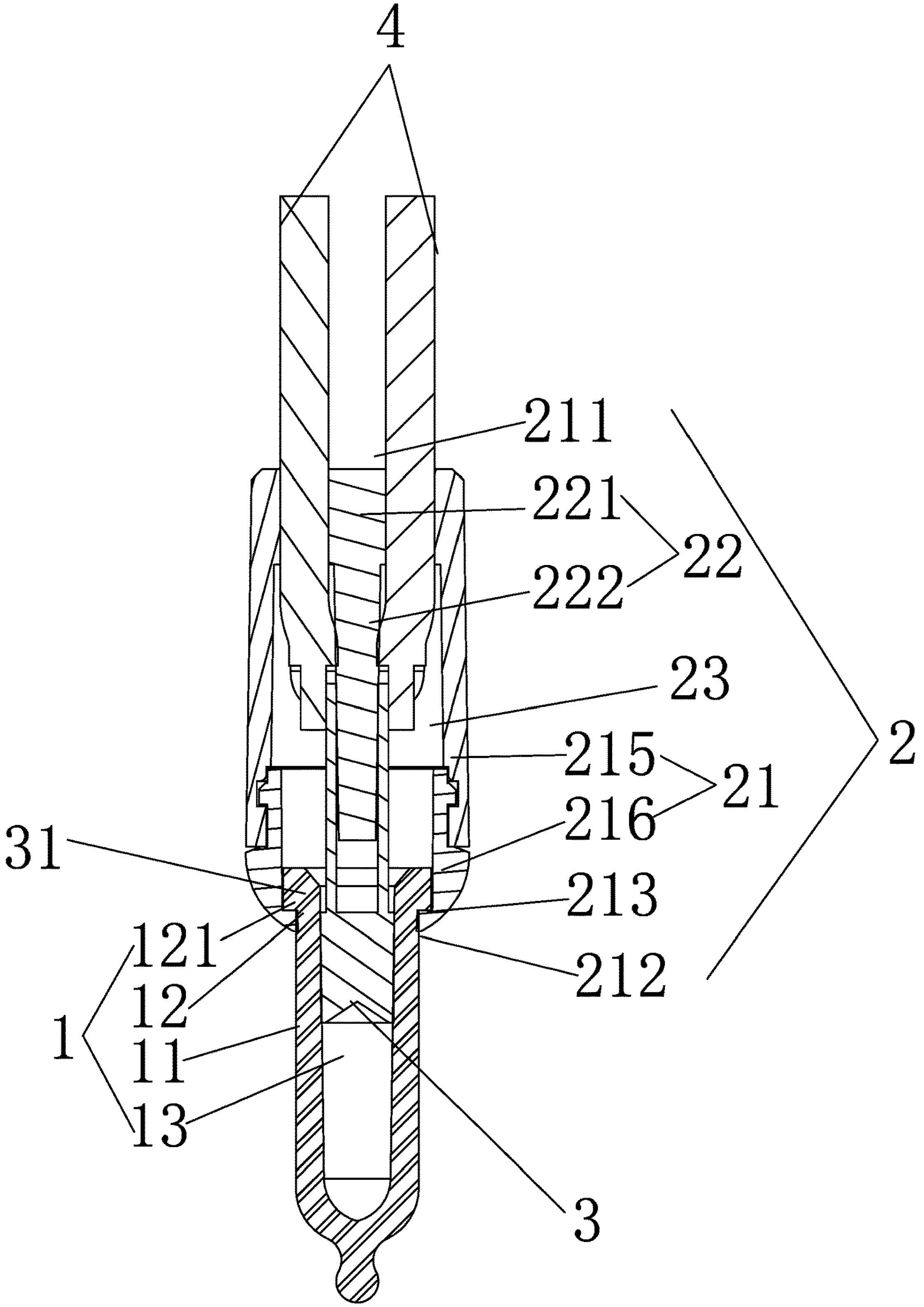
FIG. 16 is a sectional view of the second structure of Embodiment II shown in FIG. 15 when assembled.
Figure 17:
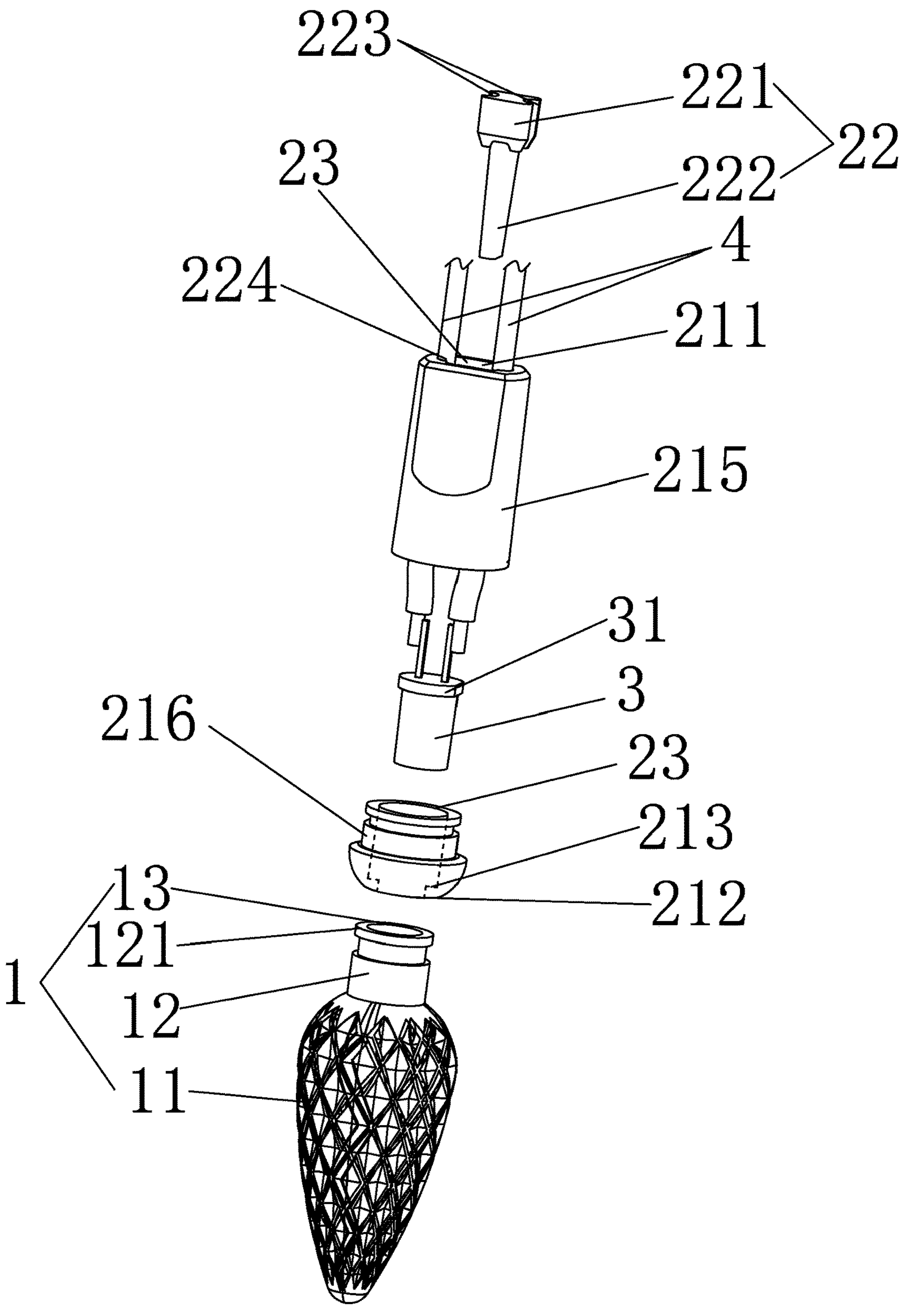
FIG. 17 is another exploded view of the second structure of Embodiment II according to the present utility model.
Figure 18:
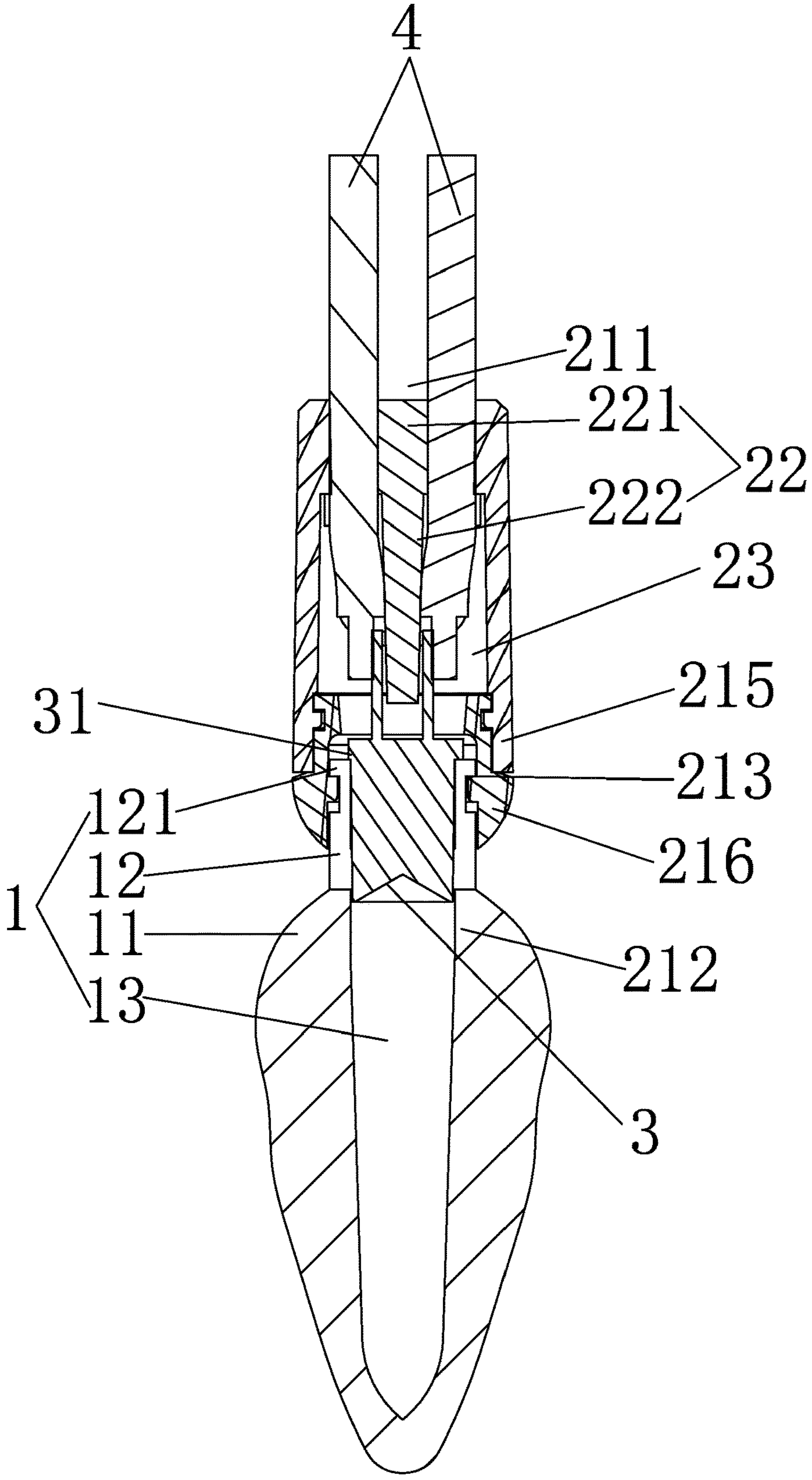
FIG. 18 is a sectional view of the second structure of Embodiment II shown in FIG. 17 when assembled.

In view of this, the production process of this structure is different from that of the first structure of Embodiment I only in that:

When the maximum diameter of the shade body 11 is less than the diameter of the second opening 212, the shade body 11 can pass through the second opening 212 along a direction from the first opening 211 to the second opening 212; with reference to FIGS. 15 to 16, step S3 will therefore comprise the following steps:

S31, forming a lampshade 1 by injection molding, wherein a shade body 11, an installation part 12, and an inner cavity 13 are simultaneously formed while forming the lampshade 1, and a second flange 121 is formed on the installation part 12;

S32, passing the two leads 4 through the channel 23 of the lampholder 21 in the first lampholder body 215 along a direction from the first opening 211 to the second opening 212, wherein part of the leads 4 extends out of the first lampholder body 215;

S33, electrically connecting the leads 4 extended out of the first lampholder body 215 in step S32 with the two poles of the LED 3 by welding;

S34, installing the LED 3 welded with the leads 4 in step S33 into the inner cavity 13, pressing the LED 3 welded with the leads 4 in the inner cavity 13 so that the first flange 31 of the LED 3 is in interference fit with an inner wall of the installation part 12;

or installing the LED 3 welded with the leads 4 in step S33 into the inner cavity 13, pressing the LED 3 welded with the leads 4 so that the first flange 31 of the LED 3 abuts against an end surface of the installation part 12;

S35, installing the lampshade 1 installed with the LED 3 and the leads 4 in the second lampholder body 216, pressing the lampshade 1 into the second opening 212 so that the second flange 121 abuts against the limiting platform 213;

S36, pressing the second lampholder body 216 against the first lampholder body 215, and connecting the first lampholder body 215 and the second lampholder body 216 by buckling.

When the maximum diameter of the shade body 11 is greater than the diameter of the second opening 212, the shade body 11 cannot pass through the second opening 212 along a direction from the first opening 211 to the second opening 212. In this case, with reference to FIGS. 17-18, step S3 comprises the following steps:

S31, forming a lampshade 1 by injection molding, wherein a shade body 11, an installation part 12, and an inner cavity 13 are simultaneously formed while forming the lampshade 1, and a second flange 121 is formed on the installation part 12;

S32, passing the two leads 4 through the channel 23 of the lampholder body 21 in the first lampholder body 215 along a direction from the first opening 211 to the second opening 212, wherein part of the leads 4 extend out of the first lampholder body 215;

S33, electrically connecting the leads 4 extended out of the first lampholder body 215 in step S32 with the two poles of the LED 3 by welding;

S34, installing the installation part 12 of the lampshade 1 into the second lampholder body 216 along a direction from the second opening 212 to the first opening 211, pressing the installation part into the second opening 212 so that the installation part 12 passes through the second opening 212 and is arranged in the second lampholder body 216, and the second flange 121 abuts against the limiting platform 213; it should be noted that, according to this embodiment, each of the installation part 12 and the second lampholder body 216 is an injection molded product and contains a certain amount of resilience that allows deformability. Therefore, the installation part 12 can be deformed and pressed into the second opening 212;

S35, placing the LED 3 and the leads 4, which are welded to each other, into the second lampholder body 216, and further pressing the LED 3 and the leads into the inner cavity 13 so that the first flange 31 of the LED 3 is in interference fit with an inner wall of the installation part 12;

or placing the LED 3 and the leads 4, which are welded to each other, into the second lampholder body 216, and further pressing the LED 3 and the leads into the inner cavity 13 so that the first flange 31 of the LED 3 abuts against an end surface of the installation part 12;

S36, pressing the second lampholder body 216 against the first lampholder body 215, and connecting the first lampholder body 215 and the second lampholder body 216 by buckling.

The rest of the process steps are the same as the corresponding process steps of the first structure of Embodiment I.

Figure 19:
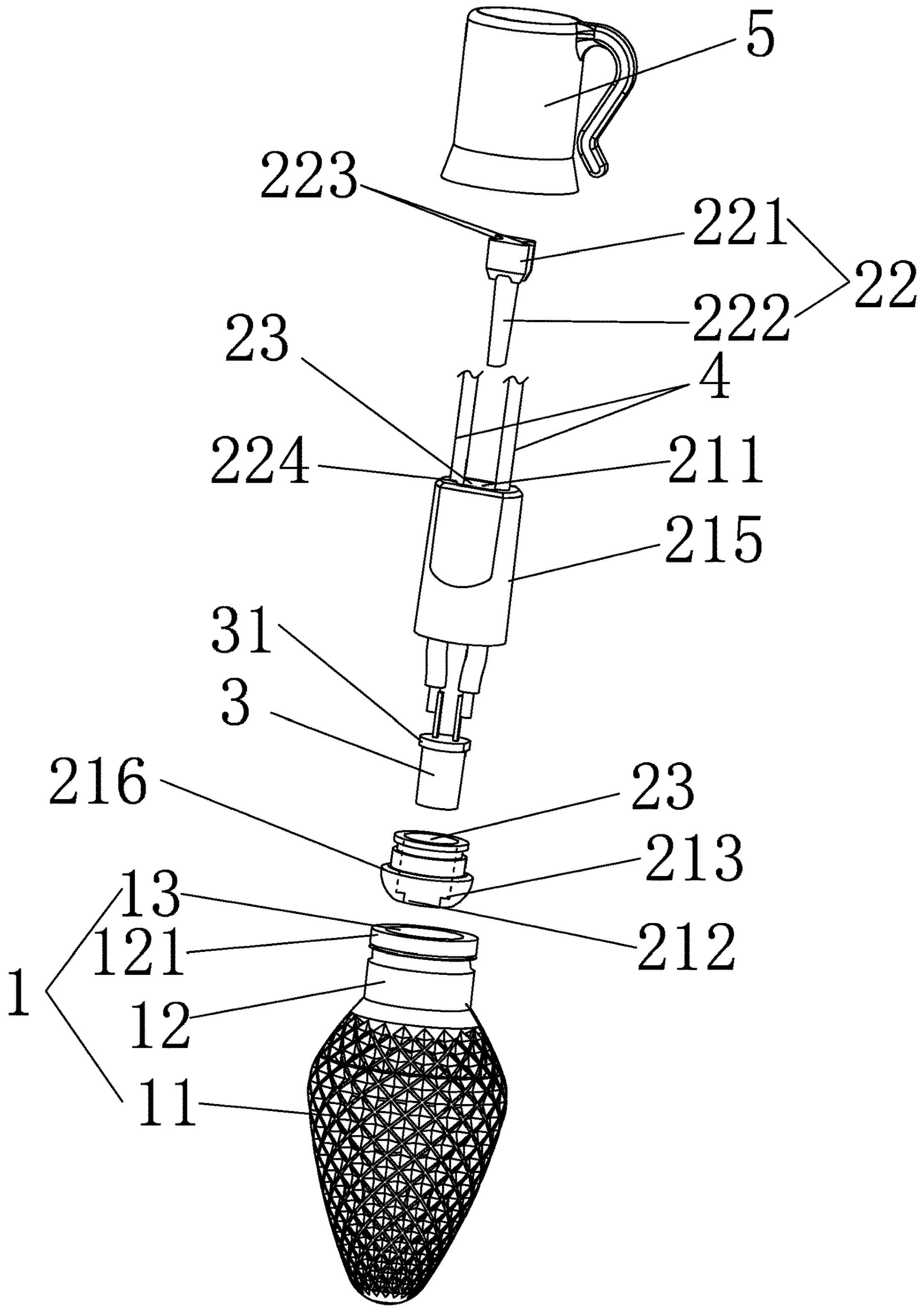
FIG. 19 is an exploded view of a third structure of Embodiment II according to the present utility model.
Figure 20:
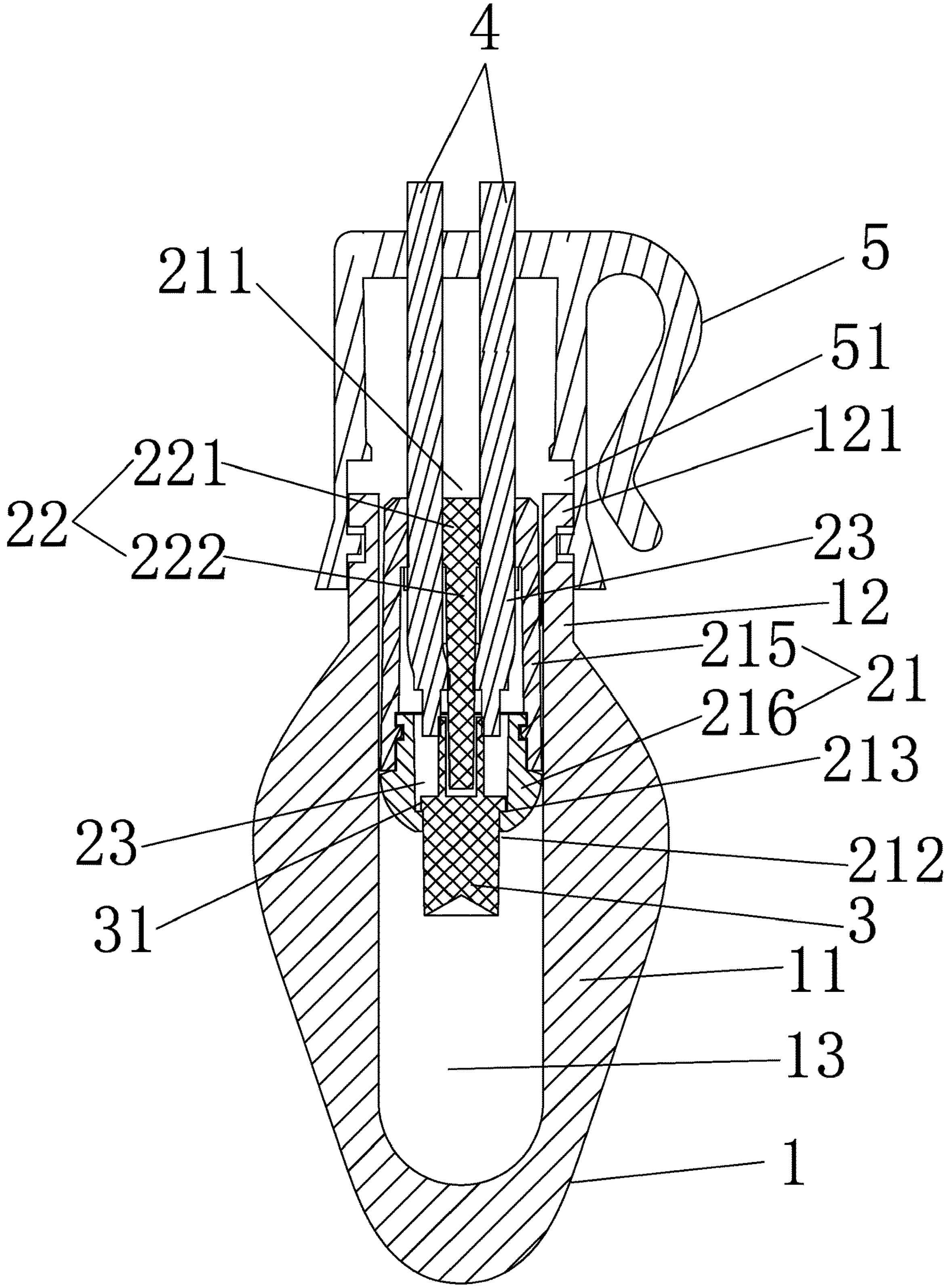
FIG. 20 is a sectional view of the third structure of Embodiment II shown in FIG. 19 when assembled.

A third structure of the LED decorative lamp of this embodiment is further provided, which is specifically referred to in FIGS. 19-20.

On the basis of the first structure of this embodiment, a cover cap 5 and a lampshade 1 removably connected with each other are additionally provided, and structures of the cover cap 5 and the lampshade 1 are the same as the cover cap 5 and the lampshade 1 disclosed in the third structure of Embodiment I, and so the cover cap 5 and the lampshade 1 herein will not be described in detail.

Meanwhile, the production process of this structure is different from the production process of the first structure of this embodiment only in that the production process of the third structure of Embodiment I is supplemented. Therefore, the detailed production process of the third structure of this embodiment will not be described in detail herein.

By adopting the technical solutions described above, this embodiment has the beneficial effects that: In this embodiment, during installation, the leads 4 are firstly installed in the first lampholder body 215 along a direction from the first opening 211 to the second opening 212, wherein the leads 4 extended out of the first lampholder body 215 are electrically welded with the two poles of the LED 3, and then the second lampholder body 216 and the lampshade 1 are assembled to each other, the separation end 222 of the blocking member 22 is installed between the two leads 4 and the two poles of the LED 3 to avoid a short circuit; the blocking end 221 of the blocking member 22 is installed in the channel 23 of the lampholder body 21 and is in interference fit with the first opening 211, and good sealing is formed between the blocking end 221 and the lampholder body 21, so that the light source parts arranged in the lampholder body 21 have a good waterproof effect, and the waterproof performance of the LED decorative lamp is effectively improved; the channel 23 is filled with an insulating glue so that the waterproof performance of the LED decorative lamp is further improved.

Although embodiments of the present utility model have been illustrated and described, it should be understood that changes, modifications, substitutions, and alterations can be made to such embodiments by those of ordinary skills in the art without departing from the principle and spirit of the present utility model, and the scope of the present utility model is limited by the appended claims and equivalents.

What is claimed is:

1. An LED decorative lamp, comprising a lampholder and light source parts arranged in the lampholder; the light source parts comprises an LED and leads; the LED is welded to the leads; the lampholder comprises a lampholder body and a blocking member configured to prevent a short circuit caused by two poles of the LED coming into contact with each other; the lampholder body and the blocking member are both made of an insulating material; the lampholder body is provided with a channel that penetrates through the lampholder body longitudinally at a first opening and a second opening of the lampholder body; the blocking member as well as the LED and the leads electrically connected are arranged in the channel; the LED partially extends out of the second opening; the blocking member comprises a blocking end and a separation end connected with each other, the blocking end is arranged in the channel and is in interference fit with the first opening to seal the first opening; the separation end is arranged in the channel and extends towards the second opening so as to be positioned between the two poles of the LED; the lampholder body comprises a first lampholder body and a second lampholder body removably connected with each other by buckling.

2. The LED decorative lamp of claim 1, wherein the channel is filled with an insulating glue.

3. The LED decorative lamp of claim 1, wherein two first grooves are symmetrically arranged at two side walls of the blocking end respectively; two second grooves are arranged in an inner wall of the lampholder body at positions corresponding to the first grooves; edges of each of the first grooves and corresponding edges of a corresponding second groove are mutually engaged to form an accommodating space to accommodate a corresponding lead.

4. The LED decorative lamp of claim 1, wherein a limiting platform is provided on the lampholder body at an inner side of the second opening, and the LED is provided with a first flange.

5. The LED decorative lamp of claim 4, wherein the first flange is arranged in the channel and abuts against the limiting platform, and a part of the LED extends out of the second opening.

6. The LED decorative lamp of claim 5, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; an outer wall of the lampholder body corresponding to the first opening is provided with a third flange, an inner diameter of the installation part is smaller than an outer diameter of the third flange, the lampholder body is arranged in the inner cavity, and the third flange abuts against an end surface of the installation part.

7. The LED decorative lamp of claim 5, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; an outer wall of the lampholder body corresponding to the first opening is provided with a third flange; the third flange is in interference fit with an inner wall of the installation part.

8. The LED decorative lamp of claim 4, further comprising a lampshade; the lampshade comprises a shade body and an installation part integrally connected with the shade body; an inner cavity is provided in the lampshade, and the inner cavity extends from the installation part to the shade body; the LED is disposed in the inner cavity; an outer diameter of the first flange is greater than an inner diameter of the installation part; when the LED is disposed in the inner cavity, the first flange abuts against an end surface of the installation part.

9. The LED decorative lamp of claim 8, wherein the installation part is provided with a second flange; an outer diameter of the second flange is greater than an outer diameter of the installation part; the second flange is arranged in the channel, and the second flange abuts against the limiting platform; the shade body is arranged outside the second opening.

10. The LED decorative lamp of claim 4, further comprising a lampshade; the lampshade comprises a shade body and an installation part integrally connected with the shade body; an inner cavity is provided in the lampshade, and the inner cavity extends from the installation part to the shade body; the LED is disposed in the inner cavity; and the first flange is in interference fit with an inner wall of the installation part.

11. The LED decorative lamp of claim 10, wherein the installation part is provided with a second flange; an outer diameter of the second flange is greater than an outer diameter of the installation part; the second flange is arranged in the channel, and the second flange abuts against the limiting platform; the shade body is arranged outside the second opening.

12. A manufacturing method for the LED decorative lamp of claim 4, comprising the following steps:

S1, forming the lampholder body and the blocking member with an insulating material by injection molding;

S2, installing the LED and the leads in the channel, pressing the LED and the leads in the channel until the LED partially extends out of the second opening;

S3, filling the channel after step S2 with a predetermined amount of insulating glue;

S4, inserting the blocking member into the channel filled with the insulating glue, and pressing the blocking member so that the separation end of the blocking member is arranged in the channel and extends towards the second opening so as to be positioned between the two poles of the LED, and the blocking end of the blocking member is arranged in the channel and seals the first opening;

S5, visually inspecting a surface of the lampholder after step S4 to determine whether the surface is clean, detecting from an appearance of a final product obtained where the insulating glue is cured to check whether there is any glue leakage, and then performing a lighting test with a test probe using an AC120V 60 HZ power supply.

13. The manufacturing method of claim 12, wherein step S2 is formed by the following steps:

S21, welding the two poles of the LED to the leads respectively;

S22, installing the LED welded with the leads in the channel, pressing the LED welded with the leads in the channel until the LED partially extends out of the second opening.

14. The manufacturing method of claim 12, wherein step S2 is formed by the following steps:

S21, passing the leads through the channel of the lampholder body in the first lampholder body along a direction from the first opening to the second opening, wherein part of the leads extend out of the first lampholder body;

S22, electrically connecting the leads extended out of the first lampholder body in step S21 with the two poles of the LED by welding;

S23, installing the LED welded with the leads in step S22 in the second lampholder body, pressing the LED welded with the leads into the second opening so that part of the LED extends out of the second opening;

S24, pressing the second lampholder body against the first lampholder body, and connecting the first lampholder body and the second lampholder body by buckling.

15. The manufacturing method of claim 12, further comprising a lampshade; the lampshade comprises a shade body and an installation part integrally connected with the shade body; an inner cavity configured to accommodate the LED is provided in the lampshade, and the inner cavity extends from the installation part to the shade body; a second flange is formed on the installation part.

16. The manufacturing method of claim 15, wherein step S2 is formed by the following steps:

S21, forming the lampshade using an insulating material by injection molding, wherein the shade body, the installation part, and the inner cavity are simultaneously formed while forming the lampshade, and the second flange is formed on the installation part;

S22, passing the leads through the channel of the lampholder in the first lampholder body along a direction from the first opening to the second opening, wherein part of the leads extends out of the first lampholder body;

S23, electrically connecting the leads extended out of the first lampholder body in step S22 with the two poles of the LED by welding;

S24, installing the LED welded with the leads in step S23 into the inner cavity, pressing the LED welded with the leads in the inner cavity;

S25, installing the lampshade installed with the LED and the leads in the second lampholder body, pressing the lampshade into the second opening;

S26, pressing the second lampholder body against the first lampholder body, and connecting the first lampholder body and the second lampholder body by buckling.

17. The manufacturing method of claim 15, wherein step S2 is formed by the following steps:

S21, forming the lampshade using an insulating material by injection molding, wherein the shade body, the installation part, and the inner cavity are simultaneously formed while forming the lampshade, and the second flange is formed on the installation part;

S22, passing the leads through the channel of the lampholder body in the first lampholder body along a direction from the first opening to the second opening, wherein part of the leads extend out of the first lampholder body;

S23, electrically connecting the leads extended out of the first lampholder body in step S22 with the two poles of the LED by welding;

S24, installing the installation part of the lampshade into the second lampholder body along a direction from the second opening to the first opening, pressing the installation part into the second opening;

S25, placing the LED and the leads, which are welded to each other, into the second lampholder body, and further pressing the LED and the leads into the inner cavity;

S26, pressing the second lampholder body against the first lampholder body, and connecting the first lampholder body and the second lampholder body by buckling.

18. The manufacturing method of claim 12, further comprising a lampshade and a cover cap removably connected with each other; the lampshade comprises a shade body and an installation part integrally connected with the shade body; an inner cavity configured to accommodate the lampholder and the light source parts is provided in the lampshade, and the inner cavity extends from the installation part to the shade body; inserting the final product already subject to the lighting test in step S5 into the inner cavity; connecting the cover cap and the installation part by buckling.

* * * * *